US006446141B1

United States Patent
Nolan et al.

(10) Patent No.: US 6,446,141 B1
(45) Date of Patent: Sep. 3, 2002

(54) STORAGE SERVER SYSTEM INCLUDING RANKING OF DATA SOURCE

(75) Inventors: Shari J. Nolan, San Jose; Jeffery S. Nespor, Pleasanton; George W. Harris, Jr., Mountain View; Jerry Parker Lane, San Jose; Alan R. Merrell, Fremont, all of CA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 09/276,428

(22) Filed: Mar. 25, 1999

(51) Int. Cl.[7] ............................................. G06F 3/00
(52) U.S. Cl. ........................ 710/8; 710/62; 709/203
(58) Field of Search ..................... 710/8, 62; 711/170; 709/203

(56) References Cited

U.S. PATENT DOCUMENTS

| | | | |
|---|---|---|---|
| 4,669,056 A | 5/1987 | Waldecker et al. | 364/900 |
| 5,537,585 A | 7/1996 | Blickenstaff et al. | 395/600 |
| 5,737,549 A | 4/1998 | Hersch et al. | 395/309 |
| 5,809,328 A | 9/1998 | Nogales et al. | 395/825 |
| 6,233,590 B1 * | 5/2001 | Shaw et al. | 707/500 |
| 6,253,271 B1 * | 6/2001 | Ram et al. | 710/128 |

FOREIGN PATENT DOCUMENTS

| | | | |
|---|---|---|---|
| WO | WO 99/34297 | | 7/1999 |
| WO | 99/34297 | * | 8/1999 |
| WO | WO 00/52576 | | 9/2000 |

OTHER PUBLICATIONS

*SUN Enterprise Volume Manager 2.5 Admin. Guide*—Chapter 1 pp. 1–1 to 1–15 Copyright 1997.

* cited by examiner

*Primary Examiner*—Matthew Kim
*Assistant Examiner*—Pierre M Vital
(74) *Attorney, Agent, or Firm*—Hamilton & Terrile, LLP; Stephen A. Terrile

(57) ABSTRACT

A storage server comprising: a processing unit, a bus system coupled with the processing unit, including a plurality of slots, slots in the plurality of slots including interfaces to respective data stores; a communication interface; and an operating system coupled with the processing unit the operating system including: logic controlling transfers among the plurality of slots over the bus system according to an internal format, logic for translating a storage transaction received over the communication interface into the internal format, and logic for configuring the plurality of slots according to a configuration data.

77 Claims, 12 Drawing Sheets

FIG. 1B

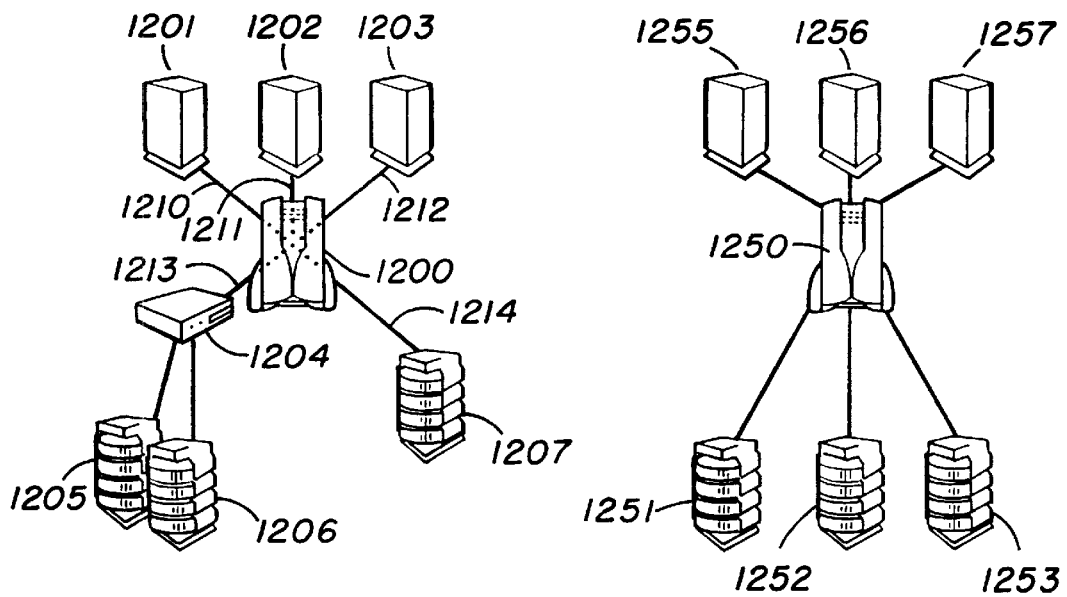
FIG. 11
FIG. 12
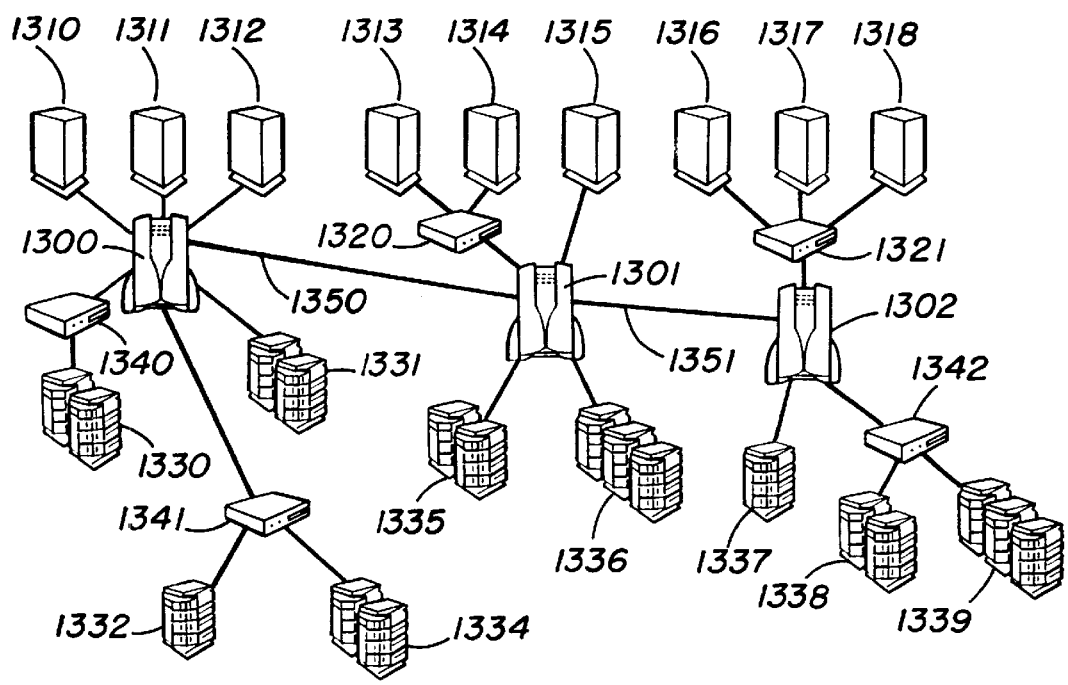
FIG. 13

STORAGE SERVER SYSTEM INCLUDING RANKING OF DATA SOURCE

BACKGROUND OF THE INVENTION

1. Field of the Invention

This invention relates to the field of storage servers. In particular, the invention relates to servers and function used for intelligent storage area networks.

2. Description of the Related Art

Technologies for data storage can be described as based on three commonly used methods: local storage, server based, and small computer system interfaces (SCSI) based.

Local storage means that the information is stored directly on the local machine. An example would be the attached hard disk on an IBM PC, or compatible. In contrast, server storage means that the information is located on one or more servers. The server has responsibility for storing the information as well as computing and processing requests based on the information. SCSI solutions are based on a bus architecture for server to storage connectivity.

These solutions have several limitations. Most of these solutions suffer from insufficient bandwidth. For example, in the network server environment, the same local area network (LAN) may need to be shared for tasks such as backup and regular data access. A second limitation is that existing server technologies can suffer from data availability problems due to server downtime. A third limitation is that the current storage technologies do not scale well as an organizations storage capacity needs grow. A fourth limitation is that when data storage and processing transactions reside in the same location it can be difficult to optimally divide resources between the two tasks.

A storage area network (SAN) can offer solutions to many of these limitations. A SAN can permit multiple servers to access the stored data simultaneously. A SAN typically uses high speed connections such as fibre channel arbitrated loops (FC-AL) to interconnect the storage devices to the servers. Additionally, LAN based PC technologies for storage can have high costs on the order of several hundred thousand dollars per due to storage management costs for file management labor and for lost productivity from downtime.

A SAN reduces server and network downtime. A SAN centralizes storage repositories such as backups, archiving, and disk mirroring and reduces administrative costs. The result is an environment with centralized management but distributed network functionality.

However, prior storage area network server architectures often rely on expensive, nonstandard components, and remain difficult to administer.

SUMMARY OF THE INVENTION

A storage server according to the present invention comprises a processing unit, a bus system coupled to the processing unit, a communication interface, and an operating system coupled to the processing unit. The bus system has slots that are adapted to hold interfaces to data stores, located either on the server chassis or across communication channels coupled to the slots. The operating system provides logic for controlling transfers over the bus system. The operating system provides logic for translating storage transactions received over the communication interface from client servers into an internal format. The operating system provides logic for processing the internal format according to configuration data that maps a storage transaction on the communication interfaces for a particular unit of storage within the extent of the protocol of the transaction to a virtual circuit corresponding to that extent using the internal format. The virtual circuit in turn manages routing of the transaction to one or more physical data stores through one or more drivers in the interfaces. Also, the server includes resources to emulate physical storage devices, so that client servers are able to use standard storage transaction protocols for access to the virtual devices without changes in configuration of the client server for storage transaction.

In one embodiment, the storage server comprises a communication interface. The communication interface supports a storage transaction communication channel. The storage server includes logic for translating a storage transaction received over the communication channel to an internal format. In one embodiment, a standard "intelligent input/output block storage architecture" ($I_2O$ BSA) message format is used as the internal format. The storage server includes logic for routing the storage transaction in the internal format to a virtual circuit. The virtual circuit manages connections to data stores in communication with the storage server including connections to physical storage device and connections to virtual devices directed by other storage servers.

According to another aspect of the invention, a storage router is provided. The storage router includes a first communication interface, other communication interfaces, a processing unit, and a bus system. The bus system is coupled with the processing unit, the first communication interface, and the other communication interfaces. The processing unit supports an operating system. The operating system directs storage transactions received over the first communication interface to appropriate other communication interfaces according to configuration data, using the virtual device architecture and emulation.

In some embodiments, the communication interface is an interface to a fibre optic medium. In some embodiments, the communication interface includes drivers compliant with a fibre channel arbitrated loop. In some embodiments the communication interface includes drivers compliant with the standard "small computer system interface version 3" (SCSI-3).

In some embodiments, the processing unit is comprised of a plurality of processing units.

In some embodiments, the bus system is comprised of interconnected computer buses. In some embodiments, the computer buses are compliant with a standard "peripheral component interconnect" (PCI) bus. In some embodiments, the communications interface is coupled to the bus system.

In some embodiments, the storage server includes nonvolatile storage. In some embodiments, the nonvolatile storage comprises integrated circuit non-volatile memory, such as flash memory.

In some embodiments, the storage server includes controllers for a disk drive. In some embodiments, the controller supports an array of disk drives. In some embodiments, the controller supports a standard "redundant arrays of independent disks" (RAID) protocol. In some embodiments, the disk drives are coupled to the controllers by a fibre optic medium. In some embodiments, the disk drives have dual interfaces for connecting to a fibre optic medium. In some embodiments, each disk drive is coupled to at least two controllers.

In some embodiments, the operating system includes logic for translating SCSI-3 instructions and data received over the communication interface into an internal format. In some embodiments, the logical unit number (LUN) associated with the SCSI-3 instructions is used to associate the SCSI-3 instructions and data with virtual devices including data stores in the storage server. In some embodiments, the initiator SCSI-3 identification number (ID) and the LUN are used to associate the SCSI-3 instructions and data with virtual devices including data sources coupled to the storage server.

In some embodiments, the operating system includes logic to monitor the performance and condition of the storage server. In some embodiments, there is logic for handling device failures and transferring control to redundant components.

The present invention provides an intelligent storage routing device managing logical and physical access to a pool of shared storage devices. The device is logically closer to the client server than to the storage devices, responds to client specific requests for storage transactions required for accessing and sharing a storage area network coupled to device. The device manages the use of a cache memory to enhance performance, fundamentally the device facilitates on the device in a preferred system access by client servers to their storage. Key functions provided at the device include authentication and access permission logic, virtual device mapping, storage mirror functions, and a large nonvolatile cache. With these basic functions many powerful storage management applications can be implemented with existing servers and storage devices, and the addition of new storage to networks is facilitated.

BRIEF DESCRIPTION OF THE FIGURES

FIG. 11 illustrates a storage area network having a storage server according to the present invention configured as a storage router or storage director.

FIG. 12 illustrates a storage area network in an alternative configuration having a storage server according to present mention configured as a storage router or storage director in a heterogeneous network.

FIG. 13 illustrates a more complex storage area network including several storage servers according to the present invention with direct communication channels between them.

DETAILED DESCRIPTION

Overview

Figure 1A:
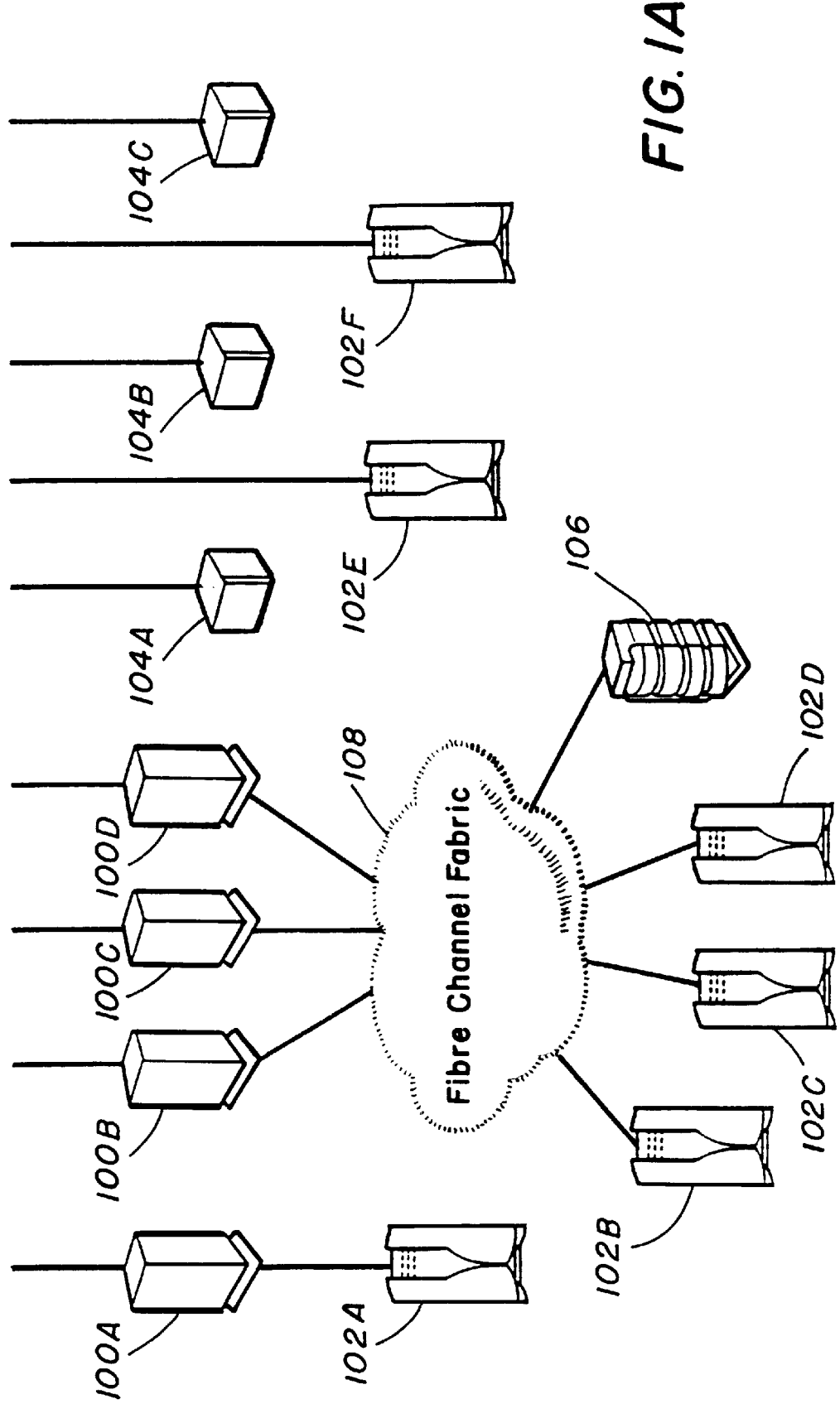
FIG. 1A illustrates a variety of uses for intelligent storage area network servers.

FIG. 1A illustrates a variety of uses for intelligent storage area network (ISAN) servers. A storage area network (SAN) can be used to provide data storage services for client computers. A storage area network is optimized to provide high bandwidth and high throughput storage for client computers such as a file server or a web server. An ISAN server provides additional functionality beyond data storage and retrieval such as storage routing and virtual device management.

FIG. 1A includes the servers 100A–D, the ISAN servers 102A–F, the thin servers 104A–C, and a storage array 106. The servers 100A–D can be UNIX servers, Windows™ NT servers, NetWare™ servers, or some other type of file server.

The servers 100A–D are coupled to client computers by network links. The ISAN server 102A is coupled to the server 100A by a network link. The ISAN server 102A provides data storage services to the server 100A by performing the requested storage transactions. The ISAN server 102A is treated like a storage device by the server 100A. The ISAN server 102A is capable of holding more storage than a typical hard disk drive or hard drive array. The ISAN server 102A can be used as a storage router and serve to provide intelligent routing among data stores coupled to the ISAN server 102A.

The ISAN server 102A also provides higher bandwidth and higher throughput processing of storage transactions than a typical hard disk drive or hard drive array. The ISAN server 102A can therefore handle the volume of demands created by multimedia data streams and other large volume data streams.

To provide the highest throughput, the ISAN server 102A may be coupled to the server 100A by a high speed network media such as fibre channel. The servers 100B–D are coupled to client computers by network links. The servers 100B–D are coupled to a storage area network by a fibre channel fabric. The storage area network includes the ISAN servers 102B–D and the storage array 106. The servers 100B–D and the ISAN servers 102B–D support drivers for a fibre channel arbitrated loop (FC-AL).

Communication between the servers 100B–D and the storage devices over the FC-AL can be accomplished using a protocol compliant with the standard small computer system interface version 3 (SCSI-3) using preferably a fiber channel medium, also termed fibre channel protocol (FCP) (e.g. SCSI—X3T10 and FCP X3.269-199X). In other embodiments, protocols such as the Internet protocol is used over the fibre channel fabric 108 carrying storage transactions in a variety of protocols. In some embodiments, the ISAN server 102A supports multiple protocols.

The thin servers 104A–C are coupled to clients by network links, but are not using storage area networks to provide data storage.

The ISAN servers 102E–F are directly coupled to clients by network links. There is no intermediate server. The ISAN servers 102E–F may provide application specific processors (ASPs) that provide functionality such as file servers, web servers, and other types of processing.

An Intelligent Storage Area Network Server

Figure 1B:
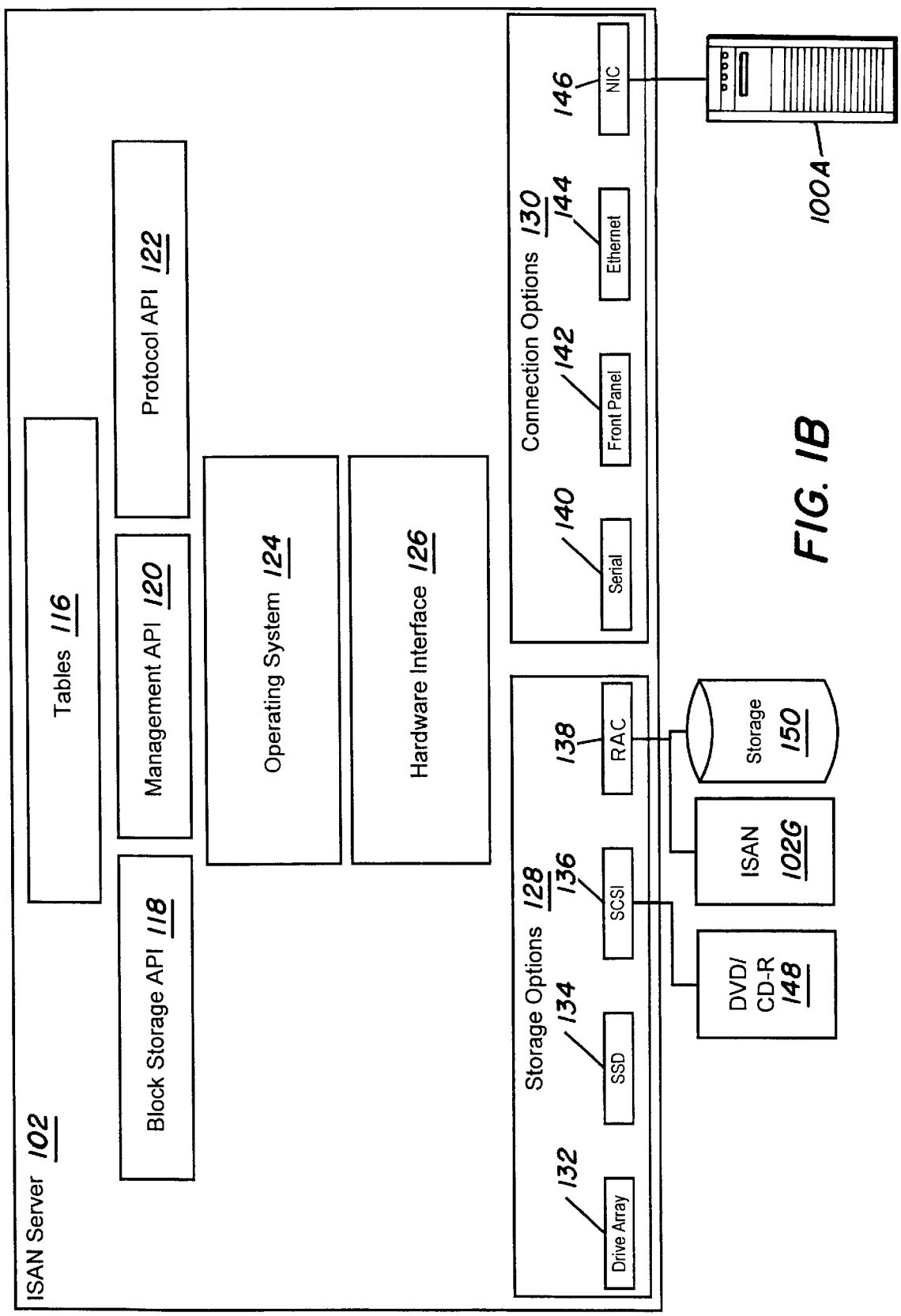
FIG. 1B is a block diagram of an intelligent storage area network server.

FIG. 1B is a block diagram of an ISAN server in one preferred embodiment, such as the ISAN server 102A, or some other ISAN server.

The ISAN server 102A has the connection options 130 and the storage options 128. The ISAN server 102A has a hardware interface 126, an operating system 124, a block storage interface 118, a management interface 120, protocol interface 122. The connection options 130 include serial connections 140, a front panel connection 142, an Ethernet connection 144, and a network interface 146. The storage options 128 includes the drive array 132, the solid state drive (SSD) 134, the SCSI interface 136, the network interface 138. The SCSI interface 136 is coupled to a DVD/CD-R 148. The network interface 138 is coupled to an ISAN server 102G and storage 150.

The connection options 130 are various methods of connecting servers and clients to the ISAN server 102A. The serial connections 140 support network management, modems for remote management, and uninterruptible power supply messages. The front panel connection 142 supports a management connection with the front panel display of the ISAN server 102A. The Ethernet connection 144 supports an Ethernet interface for management and for data transfer. The network interface 146 is one of potentially many high speed interfaces for the server to ISAN server connection. In some embodiments, the network interface 146 is a fibre channel interface with drivers for a fibre channel arbitrated loop (FC-AL). The network interface 146 may also include drivers for SCSI-3 over the fibre channel medium using fibre channel protocol (FCP).

The hardware interface 126 provides interface specific hardware components. For example, the network interface 146 has a network interface specific set of software modules to support configuration, diagnostics, performance monitoring, and health and status monitoring. These are hardware device software support modules that allow the different components to be monitored and controlled.

The operating system 124, the tables 116, and the interfaces 118–122 support the storage routing functionality of the ISAN server 102A. These components of the ISAN server 102A route storage transactions among appropriate storage options 128 and the connection options 130.

The operating system 124 provides message routing and transport facilities along with failsafe facilities. The message routing and transport facilities of the operating system 124 are used to route messages, including storage transactions, between the components of the ISAN Server 102B. These messages include message in the internal format between components of a virtual circuit. These messages can also include control messages in other formats.

The block storage interface 118 provides software modules to support block data transfers. The interface 118 includes support for striped data storage, mirrored data storage, partitioned data storage, memory cache storage, and RAID storage. The different storage types supported can be linked to form various combinations such as a mirrored data storage with a memory cache.

The protocol interface 122 provides software modules for translating and responding to requests in a variety of protocols. One set of modules are provided for the layers of an Ethernet connection: the hardware driver, the data link driver, the Internet protocol (IP) driver, the transmission control protocol (TCP) driver, the user datagram protocol (UDP) driver, and other drivers. Another set of modules provides drivers for FCP.

The management interface 120 provides software modules for managing the ISAN server 102A. There are interfaces for making archives and backups. There are interfaces for supporting the front panel display. There are interfaces for managing access to the tables 116. There are interfaces for rules based management of the system including: scheduling, or process orchestration; monitoring the system; informed consent management; and handling system processes and events. The informed consent management module is premised on providing rules based management suggestions for configuring and maintaining the ISAN server 102A.

Handling Storage Transactions

Storage transactions are received over one of the connection options 130. Storage transactions include read and write requests as well as status inquiries. The requests may be block oriented.

A typical read storage transaction is comprised of the read command and addressing information. A write storage transaction is similar except the request includes information about the amount of data to be sent and is followed by the data to be written. More specifically, using the SCSI-3 protocol, each device has an identifier (ID). The machine issuing the request is called the initiator and the machine responding to the request is called the target. In this example, the server 100A is the initiator and has ID 7. In this example, the ISAN server 102A is the target and has ID 6. The SCSI-3 protocol provides for two more addressing components, a logical unit number (LUN) and an address.

The LUN specifies a subcomponent of the target ID. For example, in a combined hard disk, tape drive enclosure, the two devices might share an ID, but have different LUNs. The third addressing component is the address where on the device data is to be read from or stored to. The ISAN server 102A provides for virtual LUNs on a per initiator basis. Thus a single ISAN server 102A might support for example ten thousand virtual LUNs or more.

The ISAN server 102A will map the SCSI-3 storage transaction request to a virtual circuit corresponding to a virtual LUN. A virtual circuit is a sequence of one or more virtual devices. A virtual device is a composed of one or more devices such as software modules or hardware components. For example, two network interface devices could be combined to be a virtual device. Similarly two cache devices could be combined as a virtual device. This design permits components to fail without disrupting the storage transaction processing capabilities of the ISAN server 102A.

A virtual circuit comprises the necessary virtual devices to support a storage transaction. Typically, the first component in the virtual circuit is a driver for translation of the storage transaction from the storage transaction communication channel format, FCP here, to an internal format. One such internal format is the intelligent input and output ($I_2O$) block storage architecture (BSA) message format. This format is storage medium and communication channel neutral.

The intermediate virtual devices of a virtual circuit provide additional services such as caching, mirroring, RAID, etc. Because the internal format is storage medium neutral, all of the intermediate virtual devices can be designed to operate on the internal format and thus interoperate with other virtual devices in the circuit.

The final virtual device in a virtual circuit is typically the format translation and communication channel drivers for controlling the storage. For example, the drive array 132 is controlled by a redundant hardware device modules (HDMs) that are grouped to form a virtual device. The HDMs provide $I_2O$ BSA to $I_2O$ SCSI translation and the HDM handles the interface to the drives that compose the drive array 132. Similarly, if the virtual circuit is a link to some other type of storage over the network interface 138, there will be a virtual device with support for $I_2O$ BSA to the storage device communication channel protocol.

The storage server also includes resources in the operating system and at the interfaces to the client servers which emulate physical storage devices. The emulation allows the virtual devices to appear to the client servers accessing the storage as if they were physical devices. Thus, the client servers can be configured to communicate using standard protocols, such as FCP using SCSI commands for storage transactions. In the embodiment utilizing SCSI commands, the emulation involves responding to an inquiry command according to the SCSI protocol with device identifiers and device capability information expected by, or compatible with, the initiating server. Also, a read capacity command and a mode page data command in the SCSI protocol are handled by the emulation resources in a manner that allows the client servers using the storage to rely on standard configuration information for physical storage devices, while the storage server spoofs the client server by emulating the physical storage devices at the interface with the client server, and maps actual storage transactions to virtual devices. The emulation resources also allow the virtual devices to be identified by the combination of an initiator, a logical unit number LUN, and a target device identifier, without requiring the storage transaction to be tied to the specific physical target device identified in the request.

Storage Routing

The ISAN server 102B supports storage routing. For example, if the server 100A was originally coupled to the storage 150 in a SAN, the ISAN server 102B can be added to the SAN between the server 100A and the storage 150 to provide new functionality and easier administration by supporting storage routing.

In the original configuration, the server 100A provided data backup and archiving functionality. This ties up the processor of the server 100A with important but bandwidth intensive functions. In the configuration of FIG. 1B, the ISAN server 102A acts as a storage router for storage transactions requested by the server 100A. Backups and archiving can be performed without tying up the server. Instead, the ISAN server 102A directs backups and archiving.

Another advantage is apparent when it becomes necessary to add a larger storage device. For example, if storage 150 is a terabyte drive array and a new drive array that supports sixteen terabytes of storage is being brought onto the network, the ISAN server 102A can migrate the data to the new array without consuming processor time on the server 100A. Further, the mirroring drivers support intelligent read and write functionality that allows the storage 150 to be shifted to the new drive array without disrupting access to the data.

Thus, as data is moved to the new storage array, read and write requests for those portions of the data will be directed to the new array while requests for other data portions will be directed to the old storage 150. Once the migration is complete, the virtual circuit can be adjusted to remove the storage 150 from the virtual circuit.

Similarly, the ISAN server 102A can reduce the amount of cache memory that needs to be bought in servers such as the server 100A. This allows the memory on server 100A to be used primarily for non-storage related purposes. This is because many servers, such as the server 100A, may use memory for caching storage requests to improve response times or to balance processor load on the server. Because this memory may be spread across several servers all coupled to a SAN, this practice is inefficient.

In contrast, the ISAN server 102A in one embodiment provides a single location for all of the cache memory. This allows the memory to be purchased in the most efficient fashion since server memory is not being consumed by storage caches. Similarly, cache memory on drive arrays connected to the ISAN server 102A such as the storage 150 do not need as much cache memory, if any.

Because a storage transaction is not linked to a data store, it is possible change the data stores supporting a virtual circuit as storage needs change or as different storage equipment is used.

Table Management

The ISAN server 102A stores management and routing information in tables such as the tables 116. The tables 116 can be accessed through the management interface 120. The tables 116 will typically be stored in some form of persistent memory such as a nonvolatile memory. The tables 116 can be maintained redundantly to provide fail safe support.

Two primary tables support the exporting of storage to clients and the storage routing functionality of the ISAN server 102A. These tables are the export table and the virtual device configuration table.

The Export Table

The export table maps addressing information received with a storage transaction to a virtual circuit or storage option. In the case of SCSI-3 over a fibre channel interface, the addressing information used is the initiator ID, the target LUN, and the target address.

It is not necessary to use all of this information to resolve each request because many LUNs can be shared across all initiators, or clients, and most LUNs will use the target address, e.g. the offset on the storage device, for addressing within the virtual circuit rather than for selecting different virtual circuits. Thus in a typical embodiment the export table might look like Table 1.

TABLE 1

| Protocol | Protocol Specific Addressing (LUN) | Initiator Specific? if yes, ID | First virtual device in circuit | Primary connection owner |
|---|---|---|---|---|
| SCSI | 0 | No | 11 | NIC 0 |
| SCSI | 1 | Yes, ID = 6 | 30 | NIC 0 |
| SCSI | 1 | Yes, ID = 5 | 60 | NIC 1 |
| SCSI | 2 | No | 12 | NIC 0 |
| TCP/IP | Port 2000 | No | 70 | NIC 0 |

The export table may include other columns such as the current state of the virtual circuit, the capacity of the virtual circuit, and other information. Also, the export table may list the entire virtual circuit in a column of the export table although in one embodiment this is not necessary.

Table 1 shows that protocol specific addressing information can be used to route the request to the appropriate virtual circuit. Therefore, only TCP sessions using port 2000 would be routed to the virtual circuit starting with the virtual device 70.

Table 1 shows that a single LUN for a protocol can be connected to different devices depending on the initiator of the storage transaction. In this example, LUN 1 is mapped to different virtual circuits based on the initiator ID.

The Virtual Device Configuration Table

The virtual device configuration table connects virtual devices with the device drivers that support the virtual device. The virtual devices are designed to support a redundant design. Therefore the table for virtual device configurations maps virtual device numbers to device modules. In one embodiment a table such as Table 2 is used to map virtual devices to supporting device drivers.

TABLE 2

| Virtual Device | Primary | Alternates | Parameters | Status | Class |
|---|---|---|---|---|---|
| 1 | 4000 | 4001 | N/A | Primary | Persistent Table |
| 10 | 1210 | 1211 | SO (00) | Alternate | FC Disk |
| 11 | 500 | 501 | VD (10) | Primary | SCS1 Target |
| 12 | 500 | 501 | VD (13) | Primary | SCS1 Target |
| 13 | 10300 | 10301 | VD (14) | Primary | Cache |
| 14 | 10200 | 10201 | VD (15, 16, null, 17) | Primary | Mirror |
| 15 | 1210 | 1211 | SO (02) | Primary | FC Disk |
| 16 | 1210 | 1211 | SO (03) | Primary | FC Disk |
| 17 | 1210 | 1211 | SO (04) | Primary | FC Disk |

???? As Table 2 shows, for each virtual device, information is provided about primary and alternate driver modules supporting the virtual device. For example in the second entry in Table 2, a fibre channel disk drive is mapped to virtual device (VD) 10.

The virtual device comprises the one or more software or hardware modules for supporting the virtual device. The parameters column is used to provide initialization information. In the case of VD 10, the parameter is SO(00) which stands for storage option 0. Each device driver module class has class specific parameters. Storage option drivers use parameters specifying a particular storage unit. Intermediary driver classes such as the mirror driver and the cache driver use parameters that specify the next virtual devices in the virtual circuit. This format allows a single device driver module to support multiple devices based on the parameter setting. Notice that in Table 2, the device driver 1210 is being used by virtual devices 10, 15, 16, and 17, but each specifies a different parameter to the driver.

The status column indicates the status of the software or hardware modules supporting the virtual device. For example, in the first entry in Table 2, the status is "primary", that means that the primary device driver, 4000 here, is being used. In the second entry in Table 2, the status is "alternate", that means that the primary device driver has failed or is not responding properly. In that case, the alternate driver, 1211 for the second entry in Table 2, is used. If a device has more than one alternate, the status column will indicate the driver being used.

EXAMPLE

For example, consider a storage transaction comes over one of the connection options 130 to the ISAN server 102A using the SCSI protocol and designating LUN 2 in the addressing information. Assume that the ISAN server 102A is configured as shown in Tables 1 and 2 for this example.

The connection option such as the network interface 146 that the storage transaction is received over is coupled to a hardware device driver. The hardware device driver receives the storage transaction and depending on the protocol dispatches it to an appropriate virtual device for handling that protocol.

For example, $I_2O$ SCSI storage transactions are sent to a device driver in the SCSI target class. Similarly, $I_2O$ IP storage transactions are sent to a device driver in the IP target class. Here, the storage transaction was made using the SCSI communication protocol so it is routed to a SCSI target device driver.

In one embodiment, the same device driver is used to support a storage channel communication protocol for all of the virtual circuits using that protocol on a given communication option. In this embodiment, the network interface device driver need only recognize the protocol type and does not need to look at the addressing information associated with the storage transaction to route the request to an appropriate target according to Table 1. In this embodiment, all of the virtual circuits associated with the SCSI protocol share the same primary and alternate device drivers on the same network interface. Therefore the third and fourth entries in Table 2 which are both linked to the same network interface according to the first and fourth entries in Table 1, are supported by the same SCSI Target virtual device drivers.

The SCSI target device driver further analyzes the request. The first part of the analysis is to determine which virtual circuit to map the request to. This can be done using the information in the export table. In this example, Table 1, indicates that a request using the SCSI protocol specifying LUN 2 should be routed to the virtual circuit starting with the virtual device 12. In one embodiment, all of the SCSI target requests are routed to the same SCSI target driver for a single interface. In this embodiment, the parameter information for the target VD 12 is used to control the behavior of the SCSI target device rather than routing the message to a second virtual device for a SCSI target.

In many instances, the SCSI target device can respond to the $I_2O$ SCSI message without routing the message further. This is common in the case of many status messages that do not relate to reading or writing from the storage itself. Otherwise, the SCSI target device here, driver number 500, translates the $I_2O$ SCSI message into an internal format. One such format is the $I_2O$ block storage architecture (BSA) format. This format is device and protocol neutral and can be used by the intermediate device drivers. Once the request is in $I_2O$ BSA format, it is sent to the next virtual device in the virtual circuit as indicated by the parameter field, here the parameter is VD(13) or virtual device 13.

The message is routed to the VD 13, which provides redundant caching drivers, here the drivers number 10300 and 10301. The caching driver uses a memory to cache storage transactions. Based on the caching algorithm being used by the driver, the driver will route storage transactions to the next virtual device in the virtual circuit at appropriate intervals. Here that next device is indicated by the parameter VD(14), or virtual device 14.

Still in the internal format, $I_2O$ BSA in one embodiment, the message is routed to VD 14. The virtual device 14 includes redundant mirroring drivers. In this case, the drivers 10200 and 10201 are used. The mirroring drivers implement a mirroring algorithm for maintaining a mirrored image of storage on multiple volumes. This mirroring driver supports a primary, secondary and tertiary store as well as a standby store. Other mirroring drivers may support different algorithms. This mirroring driver also supports the coupling of a new store that is steadily brought into synchronicity with an existing store. Based on the mirroring algorithm being used by the driver and the status of the mirrored stores, the driver will route storage transactions to the appropriate virtual devices in the virtual circuit. Assuming that both the primary and alternate stores are functioning, the mirror driver will route this request to the primary and secondary stores only according to the parameter VD(15,16,null,17), or virtual devices 15 and 16. The null in the parameter list indicates that no tertiary drive is currently being used for this virtual device.

The mirroring driver may route the storage transaction messages in serial or in parallel to the two devices. In this example, the messaging to virtual device 15 will be considered although the example can be extended to the second store, virtual device 16. Virtual device 15 includes redundant drivers for controlling a fibre channel drive. The drivers translate the internal format into a format used by the drives, e.g. $I_2O$ BSA to $I_2O$ SCSI. The drivers also provide the addressing information to the drive. Here, the parameter SO(02) is used to select a storage option, here the fibre channel drive number 2.

Hardware Architecture Overview

Figure 2:
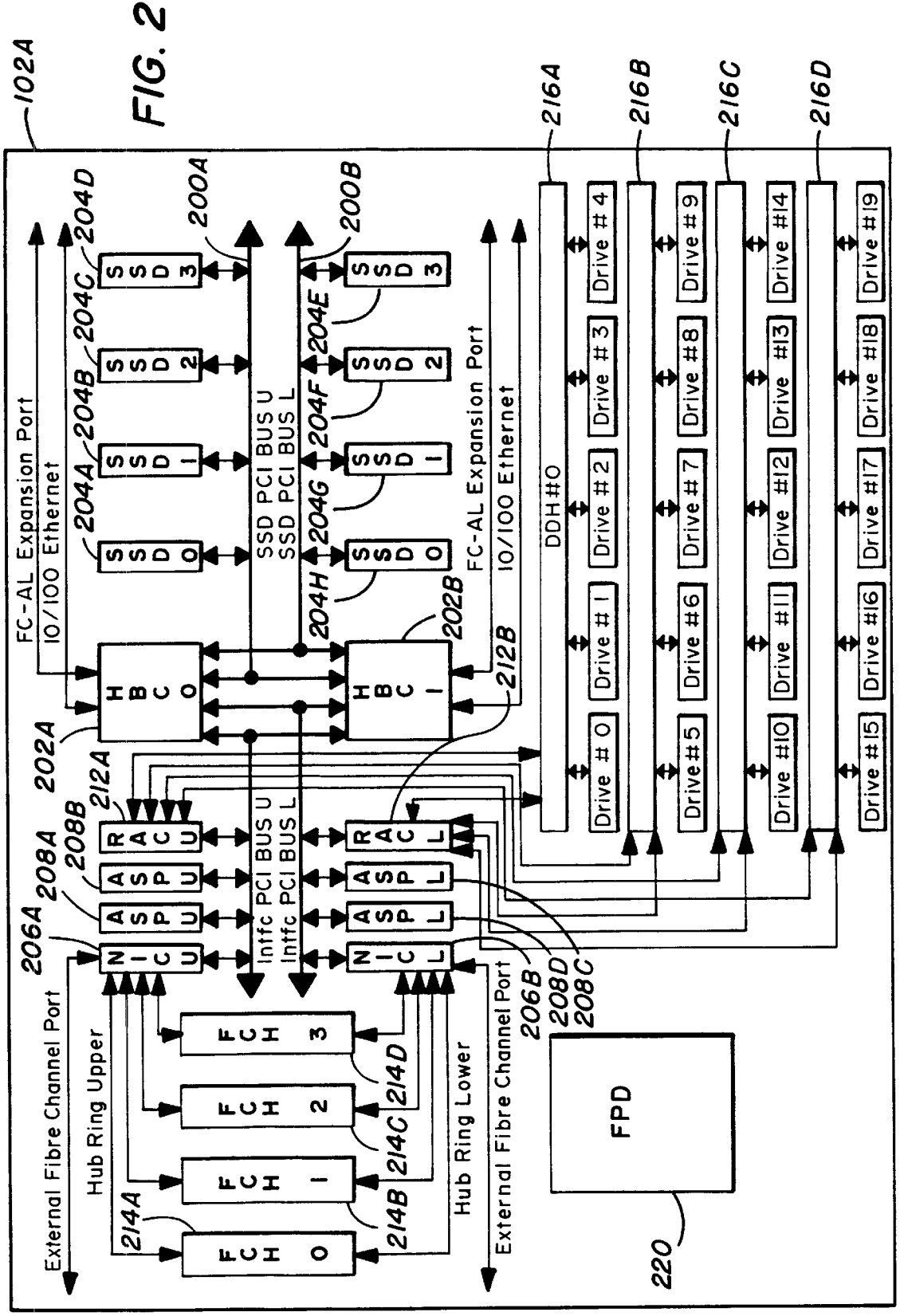
FIG. 2 is a block diagram of the hardware architecture of an intelligent storage area network server.

FIG. 2 is a block diagram of one suitable hardware architecture of an intelligent storage area network (ISAN) server. This could be the hardware architecture of ISAN servers 102A–F.

FIG. 2 includes the ISAN server 102A. The ISAN server is designed to provide a high degree of redundancy while using standard components and standards based devices. For example, ISAN server 102A uses a high speed version of the standard peripheral component interconnect (PCI) implementation and standard fibre channel arbitrated loop (FC-AL) interfaces.

The ISAN server 102A has four separate 64-bit 66 MHz PCI busses 200A–D. Many different configurations of storage devices and network interfaces in the slots of the PCI busses are possible. In one embodiment, the PCI busses are divided into two groups: the SSD PCI busses 200A–B and the interface PCI busses 200C–D. Each group has two busses that are designated by the terms upper and lower. The upper and lower busses in each group can be configured to provide redundant services. For example, the lower SSD PCI bus 200B has the same configuration as the upper SSD PCI bus 200A.

The PCI busses 200A–D are connected to host bridge controller (HBC) modules 202A–B. The HBC modules 202A–B span the PCI busses 200A–D and provide redundant bridging paths.

The SSD PCI busses 200A–B support solid state drive (SSD) modules 204A–G. The SSD modules 204A–G provide solid state storage devices such as a flash memory store.

The interface PCI busses provide interconnection from the network interface controller (NIC) modules 206A–B, the redundant arrays of independent disks (RAID) Controller (RAC) modules 212A–B, and application specific processing (ASP) modules 208A–D to the HBC modules 202A–B.

In addition to coupling the ISAN server 102A to the external FC-AL, the NICs 206A–B can be coupled to fibre channel hub (FCH) modules 214A–D. Each FCH module 214A–D is coupled to both NIC modules 206A–B. Each FCH module 214A–D provides ten FC-AL ports, and can be cascaded through the NIC modules 206A–B to provide a twenty station FC-AL hub.

The disk drive hub (DDH) modules 216A–D provide a redundant FC-AL fabric to connect disk drives to the RAC modules 212A–B. The FC-AL fabric in each of the DDH modules 216A–D comprises two redundant loops, which couple all of the drives attached to the DDH module with both RAC modules 212A–B. The RAC modules support creating a loop among all of the DDH modules 216A–D to create a 20 drive loop. The DDH modules 216A–D each support five dual-ported disk drives such as the disk drive 218.

The system mid-plane (SMP) is not depicted in FIG. 2. The SMP is a passive mid-plane that provides the interconnections shown in FIG. 2 between the HBC module 202A–B, the SSD modules 204A–H, the RAC modules 212A–B, the NIC modules 206A–B, the FCH modules 214A–D, the DDH modules 216A–D, and the ASP modules 208A–D. The SMP is compact PCI based, with four custom compact PCI busses 200A–D, RAC-DDH interconnections, and NIC-FCH interconnections and miscellaneous control busses comprising the mid-plane signals. In addition the SMP provides power distribution from the power subsystem, not depicted in FIG. 2, to the modules, at voltages of 48V, 12V, 5V, and 3.3V.

The front panel display (FPD) 220 provides a user interface for the ISAN server 102A. There is a display device and an input device. In one embodiment, a touch sensitive liquid crystal display (LCD) is used to present a touch sensitive screen with input capabilities. The FPD 220 is coupled to the HBC modules 202A–B to support status displays, configuration display and management, and other management functions.

Power and fan subsystems, not depicted in FIG. 2, provide redundant AC to DC power supplies, redundant DC to DC power conversion, battery backup for power down, and a redundant push-pull fan subsystem. These components support the high availability, low down time, features that are important when a storage area network is deployed.

The ISAN server 102A can be coupled to other ISAN servers to appear as a single network port in a storage area network or as a network attached storage device. This can be done over the FC-AL expansion ports that are coupled to each of the HBC modules 202A–B. Additionally, the HBC modules 202A–B offer RS232 serial ports and 10/100 Ethernet ports for out-of-band management.

The bus system includes all of the buses in the ISAN server 102A. In this example, the bus system includes the four PCI buses interconnected by the host bridge controllers. The bus system also includes the PCI buses internal to the HBC modules that provide additional interfaces. The slots include all of the positions on the bus system which can receive interfaces. In this example, each of the four PCI buses outside of the HBC modules can accommodate four interfaces.

The interfaces are the cards or other devices that are placed in the slots. The interfaces support drivers and hardware for the data stores coupled to the interfaces.

Host Bridge Controller Module

Figure 3:
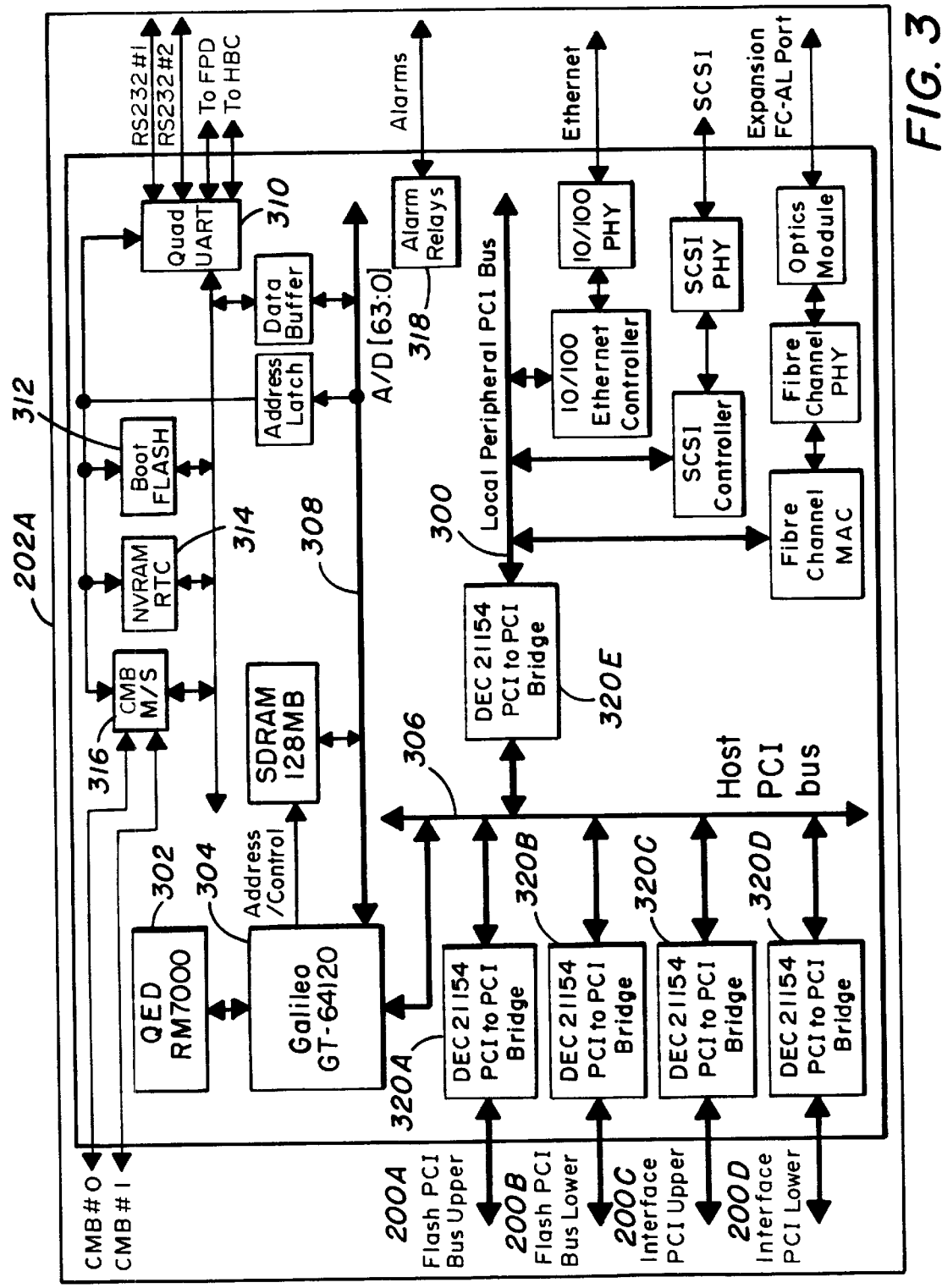
FIG. 3 is a block diagram of a host bridge controller module for use in an ISAN server.

FIG. 3 is a block diagram of a host bridge controller (HBC) module for use in an ISAN server. The HBC module could be the HBC modules 202A–B of FIG. 2.

FIG. 3 includes the HBC module 202A. The HBC module 202A bridges five PCI busses: the two PCI busses 200A–B, the two Interface PCI busses 200C–D, and a local PCI bus 300.

The processor is based on the QED RM7000 processor 302 and the Galileo GT-64120 support chip 304. The support chip 304 has three bus interfaces: a processor bus coupled to the processor 302, a 64-bit 66 MHz PCI bus coupled to the host PCI bus 306, and a local memory bus 308. The host PCI bus 306 is configured in 64-bit 66 MHz mode and allows the processor 302 to communicate with all the PCI busses in the ISAN server. The support chip 304 also permits other PCI attached processors to access memory. The local memory bus 308 is used to memory and peripherals that are components of the HBC module 202A.

A local memory 310 is present on the local memory bus 308. The local memory 310 is comprised of both memory for storage and cache memory for the PCI bus. The local memory bus 308 supports a quad UART 310 to provide four serial ports. The quad UART supports a redundant HBC module to HBC module communication link; a link to the front panel display, and two serial ports for remote management. The local memory bus 308 also supports a nonvolatile storage for the boot image 312, a card management bus (CMB) master/slave AVR microcontroller (AT90C8515) 316, and a nonvolatile storage with real time clock (RTC) module 314. The CMB master/slave AVR microcontroller 316 controls both system CMB busses, as only one CMB bus is active at time in this embodiment. Alarm relays 318 are provided for signaling alarms under the control of the processor 302.

The PCI Bridge subsystem is the host PCI bus 306 that is coupled to the support processor 304 and five PCI bridge chips 320A–E. The local PCI bus 300 couples additional PCI based peripherals to the ISAN server. They are placed on a local PCI bus because they may operate at a slower speed than other components of the ISAN server. Attached to the local PCI bus 300 is the expansion port fibre channel for coupling multiple ISAN servers together, the 10/100 Ethernet controller and a SCCI controller. The expansion port permits chaining multiple ISAN servers. A proprietary protocol may be used for this connection. The 10/100 Ethernet controller provides an out of band management interface. The SCSI controller provides an interface to archival devices such as digital versatile disks (DVD) and tape drives.

HBC Module Redundancy

The HBC module redundancy and fail-over supports system redundancy. Although the HBC modules 202A–B can both be active at once, only one is designated as the master by a HOST_SEL signal. The master HBC module provides PCI bus arbitration for all of the PCI busses, controls all of the power enables to the other modules, and is the recognized master on the CMB device. The backup HBC module's PCI bus arbitration signals and power enables are disabled by the HOST_SEL signal. The CMB is switched at each of the cards' slave CMB or FCB device by the HOST_SEL signal. The HOST_SEL signal is pulled down on the system mid-plane (SMP) by a resistor, causing HBC module 202A to be the default master. HBC module 202B can drive the HOST_SEL signal to make itself the master, but this will typically occur only during fail-over or at startup if HBC module 202A is not present.

To reduce the chance of an error, the EVC drives the HOST_SEL signal and requires a write to two separate memory locations of a specific pattern. This may prevent a malfunctioning HBC module from making itself the master. Both HBC modules' power enable signals are pulled low on the SMP enabling power to both cards at startup. HBC module 202A has control over the power enable for HBC module 202B. Similarly, HBC module 202B has control over the power enable for the HBC module 202A. Again, to reduce the chance of error, driving an HBC module's power enable signal requires a write to two separate memory locations of a specific pattern.

PCI bridges do not support dual hosts. By specially configuring the PCI bridges, both HBC modules can be configured to be on the system PCI busses. The PCI bridges on both HBC modules are configured such that the address space controlled by one HBC module is considered mapped as memory space local to all of the system PCI busses on the other HBC module's PCI bridges. Errors may result if one HBC module tries to read or write to the other's PCI address space. The error will result because four bridges to the system PCI busses will acknowledge the transaction causing serious errors. Therefore, one HBC module should not try to access the other HBC module over the system busses.

Although the HBC modules should not communicate over the PCI busses, the HBC modules do have two separate paths of communication: a dedicated serial port and the CMB. The dedicated serial port is the primary path for communication to allow passing of messages to provide a sanity check on the other HBC module. If the serial port fails, the CMB can be used as a backup to determine which HBC module has failed.

HBC Module Startup Sequence

Because both HBC modules are powered up by the EVC when the system is powered up, they need to determine whether there is another HBC module present when they are powered up. This is done through the CMB. If it is present HBC module 202A will default as the master. If HBC module 202A determines on power up that there is no HBC module 202B present, it can disable power to the HBC module 202B card slot. This permits a second HBC module to be added and powered up under the control of the master HBC module. If the HBC module 202A determines that the HBC module 202B is present, it should establish communications through the serial port. If the HBC module 202B determines on power up that the HBC module 202A is not present, it should make itself the master HBC module by setting the HOST_SEL signal and disabling power to the HBC module 202A card slot. If the HBC module 202B determines that the HBC module 202A is present, it should wait for HBC 0 to establish communications through the serial port. If after a certain time communication has not been established, the HBC module 202B should initiate a fail-over sequence.

HBC Module Failover Sequence

The HBC modules should communicate with each other at specific intervals over the serial interface. If the backup HBC loses serial communication with the master HBC, it should attempt to establish communication with the master HBC module over its CMB. If communication can be established over the CMB and both hosts are sane, then the serial communication link is bad. Both cards should perform diagnostics to determine where the fault is located. If the fault is on the backup HBC module, or can not be isolated, an alarm should be triggered. If the fault is on the master HBC module or a CMB communication cannot be established, the backup HBC module should power down the master HBC module and make itself the master.

Solid State Drive Module

Figure 4:
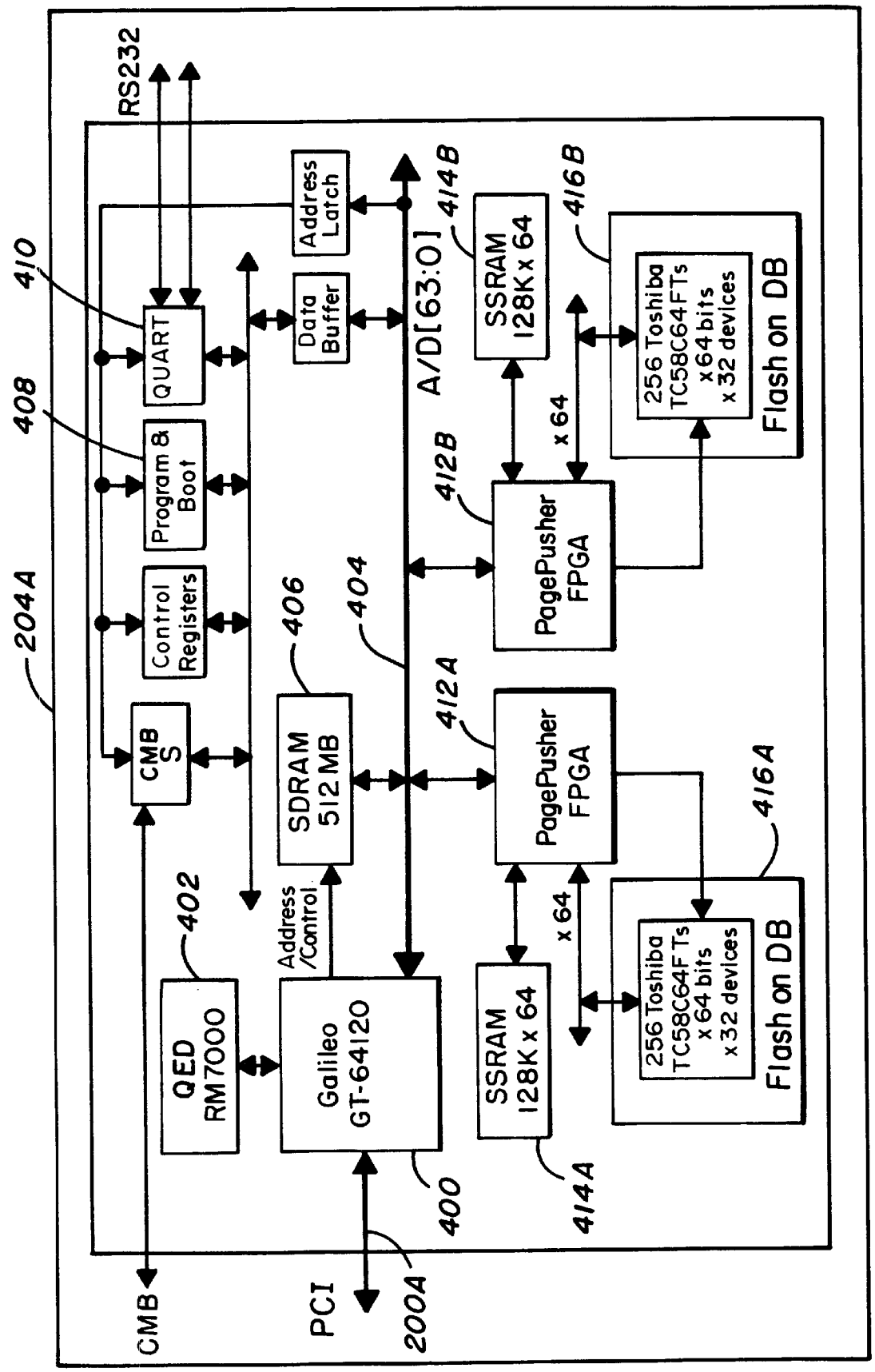
FIG. 4 is a block diagram of a solid state drive module.

FIG. 4 is a block diagram of a solid state drive (SSD) module. This could be one of the SSD modules 204A–H. The SSD modules provide nonvolatile memory storage.

FIG. 4 includes the SSD module 204A. The SSD module design is similar to the design of the HBC module 202A. A Galileo GT-64120 support processor 400 couples the PCI bus 200A to the module. The support processor 400 is coupled to the QED RM7000 processor 402.

A local memory bus 404 connects the memory and peripherals. The memory on the SSD module includes: 512 MB of synchronous dynamic random access memory (SDRAM) and program and boot flash 408. The local memory bus 404 also supports a DUART 410 which provides serial ports.

The flash subsystem is divided into two blocks of nonvolatile storage. Each block contains a controller 412A–B, nonvolatile storage 416A–B, and a memory buffer 414A–B. The controllers 412A–B can be field programmable gate arrays (FPGAs) or some other type of controllers. The memory buffers 414A–B are high speed memory such as synchronous static random access memory (SSRAM). The memory buffers 414A–B are used to pass pages of data to and from the nonvolatile storage. The nonvolatile storage 416A–B can be flash memory or some other type of nonvolatile storage. In typical embodiments, the SSD module 204A will provide 2–4 GB of storage. The controllers 412A–B and the nonvolatile storage 416A–B can be arranged according to the design of Norman Dancer as described in the U.S. patent application Ser. No. NOT YET ASSIGNED, entitled "Method and Apparatus for Interfacing High Speed Bus with Memory", filed NOT YET FILED, to provide a high throughput solid state drive store on the order of ~80 MB/sec.

RAID Controller Module

Figure 5:
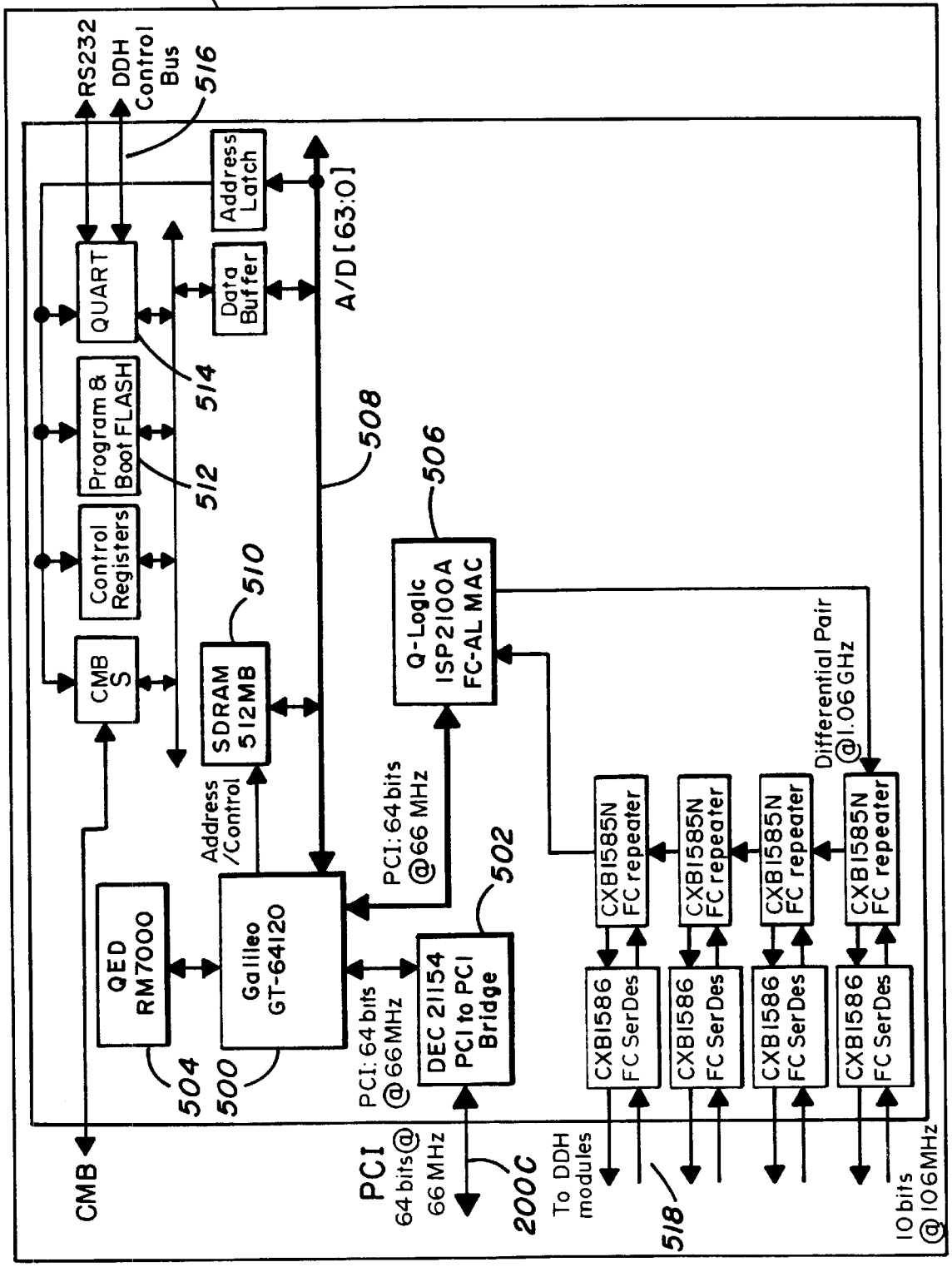
FIG. 5 is a block diagram of a RAID controller module.

FIG. 5 is a block diagram of a RAID controller (RAC) module. This could be used as the RAC module 212A–B.

FIG. 5 shows the RAC module 212A. The RAC module 212A provides control for 20 disk drives connected to the RAC module via DDH modules.

The RAC module 212A uses the same processor and support processor design as the HBC modules and the SSD modules. However, the PCI bus 200C is bridged by the PCI bridge chip 502 into a 64-bit 66 MHz PCI bus. The support processor 500 is coupled to the bridge chip 502. The fibre channel system is based on for example, the Q-Logic ISP2100A or ISP2200A fibre channel MAC 506. The fibre channel MAC 506 is coupled to the support processor 500 by a 64-bit 66 MHz PCI bus.

The local memory bus 508 couples the support processor 500 with memory and peripherals. The memory includes 512 MB of SDRAM 510 and 8MB of nonvolatile storage 512. The local memory bus also supports a QUART 514 providing a serial link for debugging. A CMB controller is provided to communicate with the HBC master.

The fibre channel MAC 506 is coupled to a four port fibre channel repeater loop. The fibre channel MAC 506 interfaces to fibre channel devices via a serial 1.0625 Gb fibre channel link. The port 518 is coupled to the input port of the DDH module 216A. The other ports are coupled to the other DDH modules 216B–D.

The PCI bridge 502 is a DEC21154 PCI to PCI bridge that provides 32-bit to 64-bit conversion to the external PCI bus. This prevents the narrower card bus of the RAC module 212A from slowing down the PCI bus 200C throughput.

Network Interface Controller Module

Figure 6:
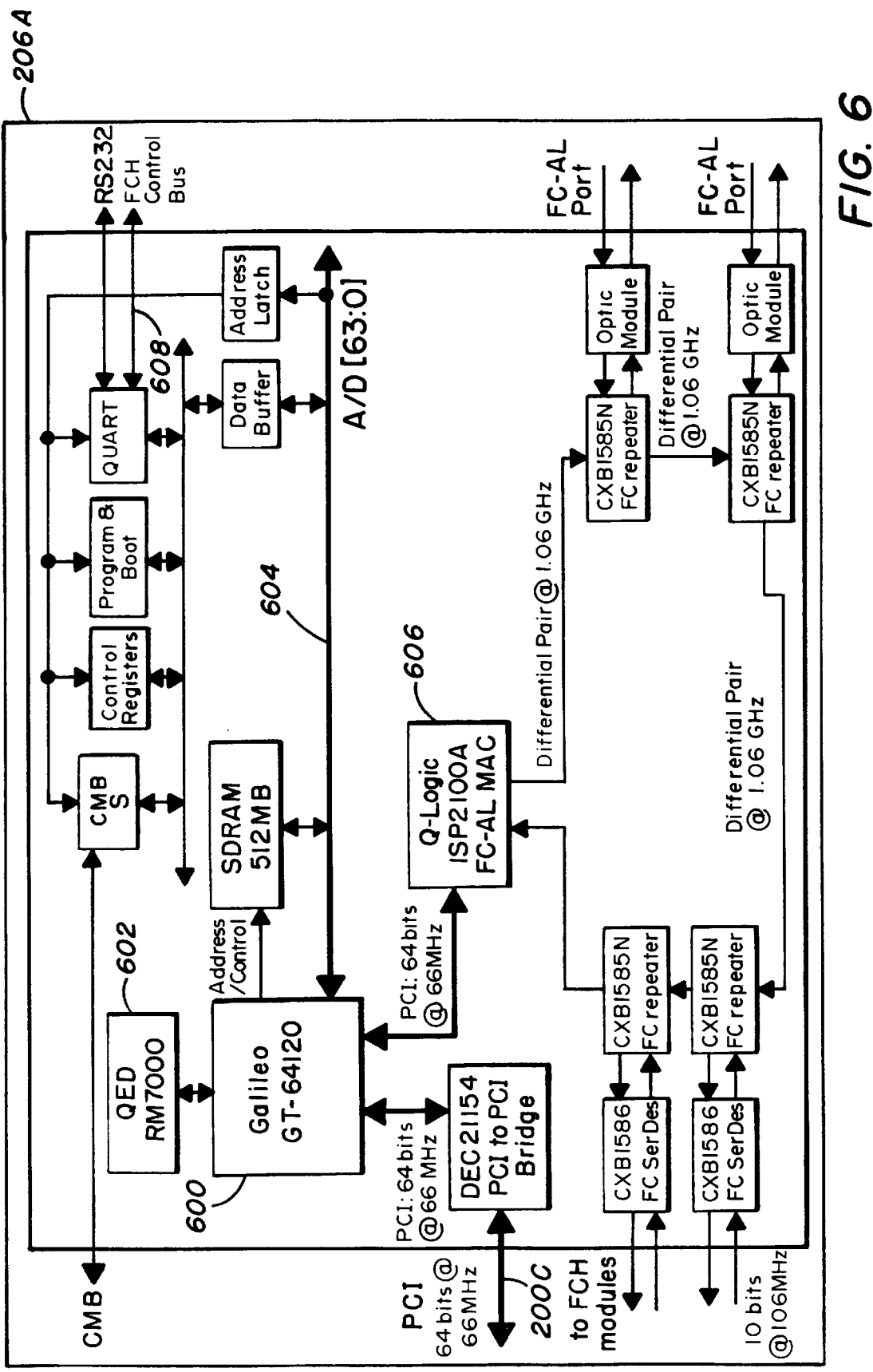
FIG. 6 is a block diagram of a network interface controller module.

FIG. 6 is a block diagram of a network interface controller (NIC) module. This could be used as the NIC modules 206A–B.

FIG. 6 includes the NIC module 206A. The NIC module design is similar to the RAC module design and supports redundant FC-AL connections as well as connections to FCH modules 214A–D to allow cascaded fibre channel connections. The Galileo GT-64120 support processor 600 is coupled to the PCI bus 200C by a bridge chip that narrows the bus width to 64-bit 66 MHz PCI. The support processor is coupled to a QED RM7000 processor 602, a local memory bus 604, and a FC-AL MAC interface 606. A 64-bit 66 MHz PCI bus is used between the support processor 600 and the FC-AL MAC interface 606. The local memory bus 604 also supports a QUART providing a serial link for debugging. A CMB controller is provided to communicate with the HBC master.

The FC-AL MAC interface 606 is a Q-Logic ISP2100A or ISP2200A Fibre Channel MAC. The FC-AL MAC interface 606 is coupled to a four port fibre channel repeater loop. The FC-AL MAC interface 606 interfaces to fibre channel devices via a serial 1.0625 Gb fibre channel link.

Fibre Channel Hub Module

Figure 7:
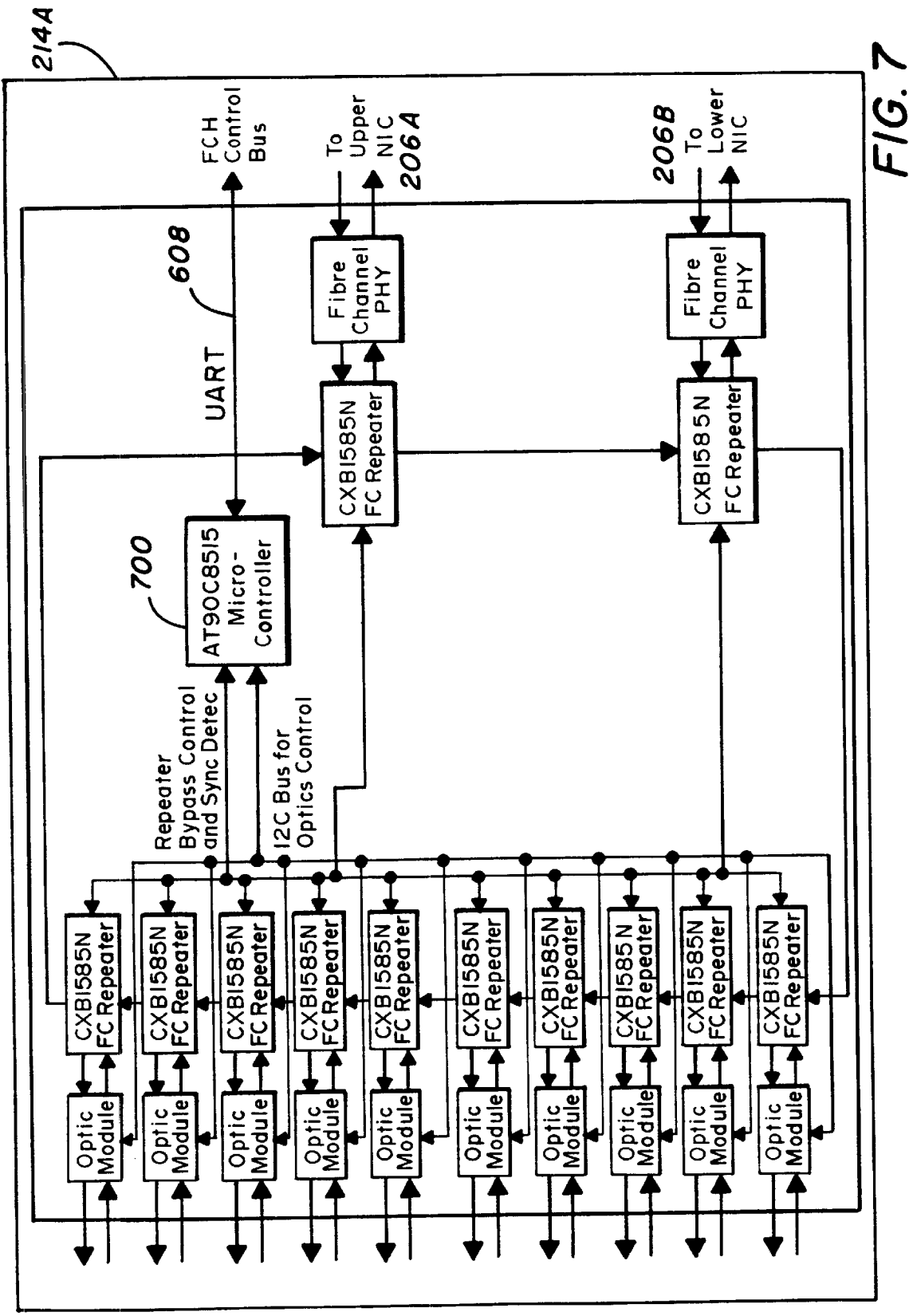
FIG. 7 is a block diagram of a fiber channel hub module.

FIG. 7 is a block diagram of a fiber channel hub (FCH) module. This could be used as the FCH modules 214A–D.

FIG. 7 includes the FCH module 214A. The FCH module 214A provides 10 port FC-AL hub. The FCH modules can be cascaded via the NIC modules 206A–B to form a 40 port hub. An AT90C8515 controller 700, or some other type of controller, decodes the information received over the serial link 608 with the NIC modules 206A–B to control the ports of the FCH module 214A.

Disk Drive Hub Module

Figure 8:
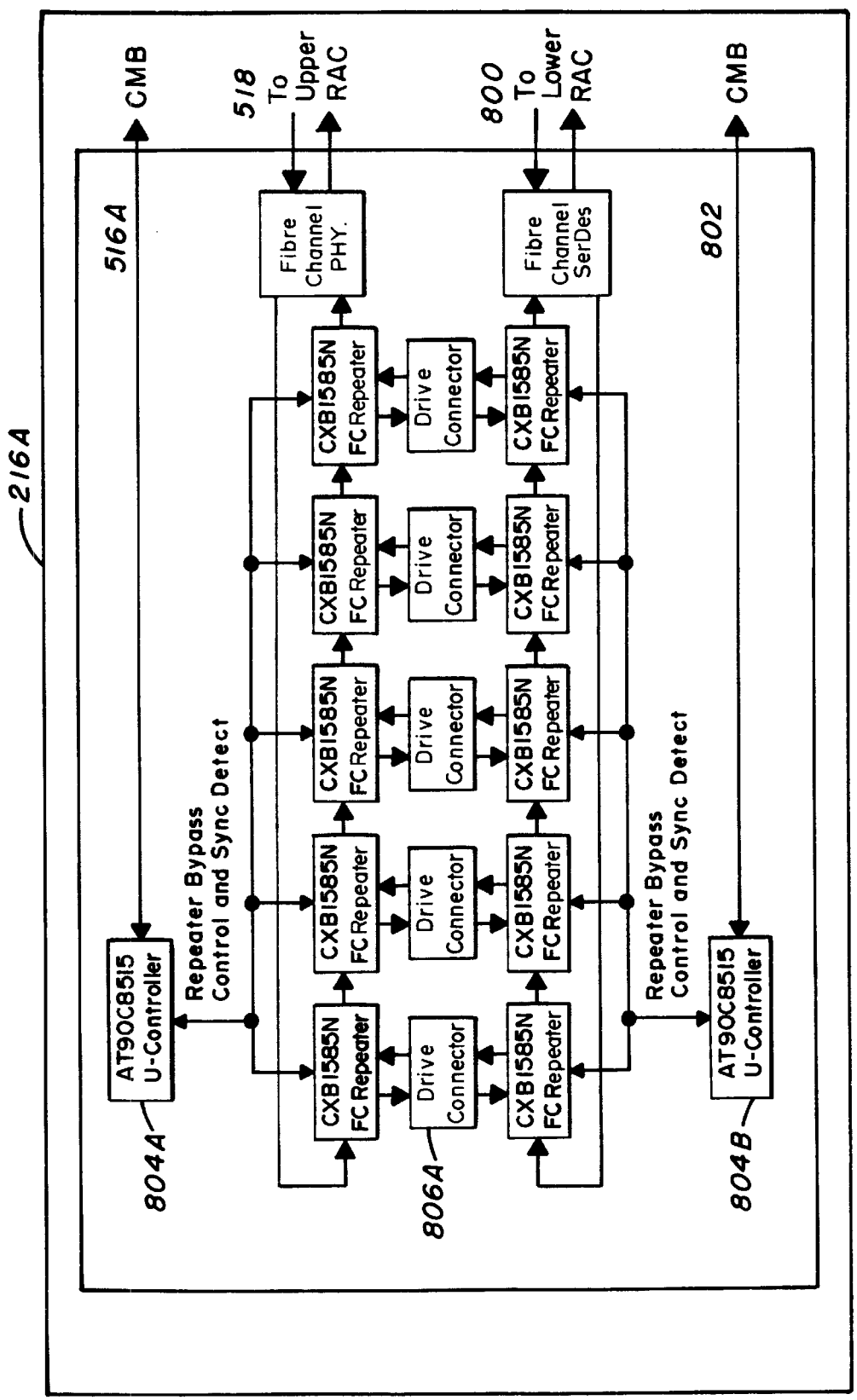
FIG. 8 is a block diagram of a disk drive hub module.

FIG. 8 is a block diagram of a disk drive hub module. This could be used as the DDH module 216A–D.

FIG. 8 includes a DDH module 216A. The DDH module provides a redundant FC-AL fabric for five disk drives in one embodiment. There are four DDH modules in one embodiment and accordingly, there is a maximum of twenty drives using this configuration. Other configurations of drives and DDH modules may be possible.

The DDH module 216A has a FC-AL connection to the RAC module 212A at the port 518. The DDH module 216A has a FC-AL connection to the RAC module 212A over the link 800. The DDH module 216A has a CMB interface to communicate with the HBC and a 10 bit bus to the RAC module 212A.

The two fibre loops are each controlled by an Atmel AT90C8515 controller 804A–B or some other type of controller. The controller responds to respective signals over the CMB and the serial link to switch data among drives and to remove operation of drives that are not present or faulty. The drive connector 806A is a dual port drive connector which can be used for any FC type disk drive. Additionally, the drive connector 806A supports hot swapping of drives while the system is operational.

Redundancy and Fail-Over

The ISAN server 102A offers a high degree of redundancy. In one embodiment there are redundant NIC, RAC, and HBC modules. The SSD modules and drives support mirroring. The drives also support parity and dual channel access. Each DDH module contains a fully redundant FC-AL fabric for connection to the RAC modules. Fail-over is handled by the HBC modules, which control the other modules in the ISAN server. The control is multi-layered.

The HBC module's first layer of control over is the power supply control. Each module has an individual power supply enable signal that is controlled by the CMB controller on the module. Although the HBC modules are redundant, only one HBC module will server as the master HBC module and direct and control the system. The other HBC will act as a slave. When a module is plugged into a slot, its power supply is initially disabled. Only the master HBC module can enable the power supply. If a module begins to perform improperly and does not respond to commands, the module HBC module can disable the power supply to the module.

The second layer of control for the HBC modules is the card management bus (CMB). Each module has an Atmel AT90S8515 (AVR) microcontroller that is coupled to the CMB. The HBC module itself has an AVR microcontroller 316 that can act as a master or a slave. The CMB is mid-plane powered rather than module powered, and can respond to the HBC module even when power is off to a module. The CMB allows the master HBC to read a card type, determine if a card is present, send a non-maskable interrupt to a card or perform a hard reset of a card. Module processors and the master HBC module can also perform communication through a serial port on the AVR microcontroller on the module. This communication path can be used as a backup in case of a PCI failure.

The third level of control for the HBC modules is the PCI bus. Normal I$_2$O messaging should be used to keep track of module status and ensure module performance. If a module does not respond, it can be queried via the CMB. If the module still does not respond, a non-maskable interrupt can be set via the CMB. If the module still does not respond, it can be reset via the CMB. If after reset, the module still does not respond, it can be powered down and a warning can be issued to replace the module.

Software Architecture Overview

An ISAN server is supported by an operating system that is designed to support the unique high bandwidth, high throughput, demands of a storage server. The operating systems schedules and controls data transfers over the bus systems and manages the system. Although a number of different operating system and software component structures are possible, in one embodiment, a highly modular operating system designed for a storage server is used.

Figure 9:
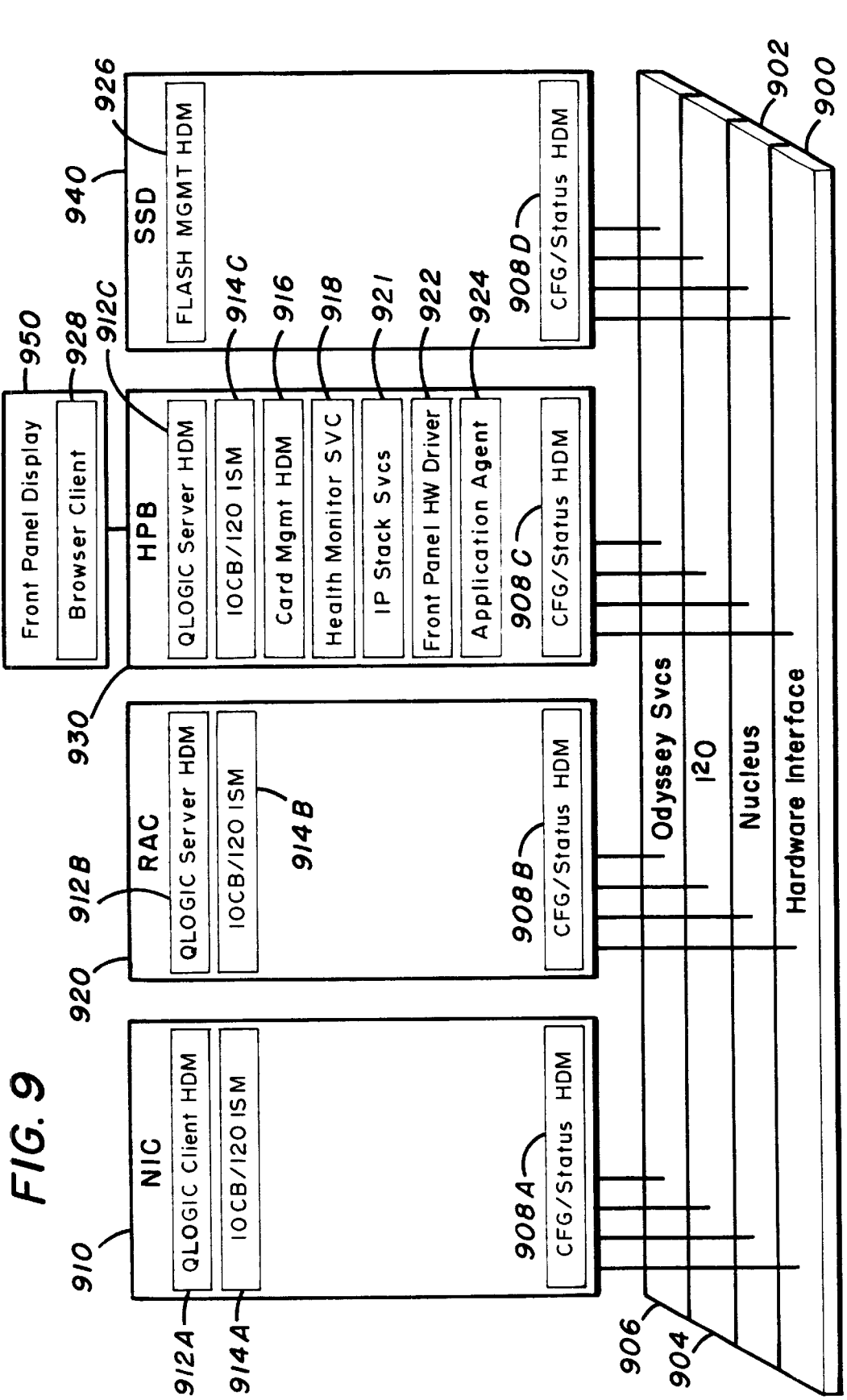
FIG. 9 is a block diagram of the software modules of an operating system and supporting programs for an intelligent storage area network server.

FIG. 9 is a block diagram of the software modules of an operating system and supporting programs for an ISAN server.

FIG. 9 includes the following operating system components: hardware interface module 900, the Nucleus PLUSTM real-time kernel module 902 available from Accelerated Technologies, Inc., Mobile, Alabama, the intelligent input and output (I$_2$O) module 904, and the storage services module 906. The hardware interface module 900 allows the software components of the ISAN server to communicate with the hardware components of the ISAN server.

The Nucleus PLUS™ real-time kernel module 902 is used to provide basic operating system functions such as: tasks, queues, semaphores, times, and critical section support. The Nucleus PLUS™ real-time kernel module 902 is exported to the software modules of the ISAN server as functions in C++ classes by the storage services module 906.

The I$_2$O module 904 permits the ISAN server to support the standard I$_2$O messaging and architecture for input and output. In I$_2$O parlance, the hardware modules such as the RAID controller (RAC) modules, the network interface controller (NIC) modules, the solid state drive (SSD) modules, the disk drive hub (DDH) modules, and the fibre channel hub (FCH) modules, are all input/output processors (IOPs). The master host bridge processor (HBC) module serves as the I$_2$O host.

The storage services module 906 implements messaging classes to support the reliable transport of messages between components. The storage services module 906 supports the operation of device driver modules and support for virtual devices. The device driver modules (DDMs) and virtual devices (VDs) are the building blocks of the ISAN server storage system. The storage services module 906 is organized around providing support for requests, or storage transactions.

In some applications, a single ISAN server such as the ISAN server 102A will have several hundred DDMs operating in conjunction with the operating system modules 900–906 to support responses to storage server requests. Other applications use a few DDMs in various combinations.

Software components are implemented as device driver modules (DDMs). A DDM that primarily services requests for a hardware device is termed a hardware device module (HDM). A DDM that serves as an intermediate program is termed an intermediate service module (ISM). For example, the DDMs that service the SSD modules could be termed HDMs. The DDMs that provide cache services, mirroring services, and other types of services not directly linked to a hardware device could be termed ISMs.

A single DDM can have multiple instantiations on a single ISAN server. For example, in FIG. 9, there are four instantiations of the configuration and status HDM 908A–D, one for each of the four major software subsystems: the NIC 910, the RAC 920, the HBC 930, and the SSD 940. Each DDM has its own message queue and a unique identifier. For example, the configuration and status HDM 908A on the NIC 910 might be device id (DID) 0. Each DDM also lists the class of storage requests handled by the DDM and the operating system modules route the requests to the DDMs based on the class of the storage request.

The NIC software subsystem 910 includes three DDMs: a processor support HDM 912A, an input/output translation ISM 914A and the configuration and status DDM 908A. The RAC software subsystem 920 includes three DDMs: a processor support HDM 912B, an input/output translation ISM 914B, and a configuration and status DDM 908B. The HBC software subsystem 930 includes: a processor support HDM 912C, an input/output translation ISM 914C, a card management HDM 916, a system monitor DDM 918, an Internet Protocol DDM 921, a front panel display DDM 922, an application specific processor support DDM 924, and configuration and status HDM 908C. The SSD software subsystem 926 includes a solid state drive management HDM 926 and a configuration and status HDM 908D. The front panel display 950 supports a hypertext markup language (HTML) client 928.

In order to increase the reliability and flexibility of the system, the DDMs can in turn be organized into virtual devices. In that fashion, storage transactions are handled by virtual devices of the ISAN server. For example, a mirrored storage device could be constructed without respect to what type of physical storage was being used. A mirroring DDM would be coupled to two other device drivers in the virtual device chain.

Front Panel Display

Figure 10:
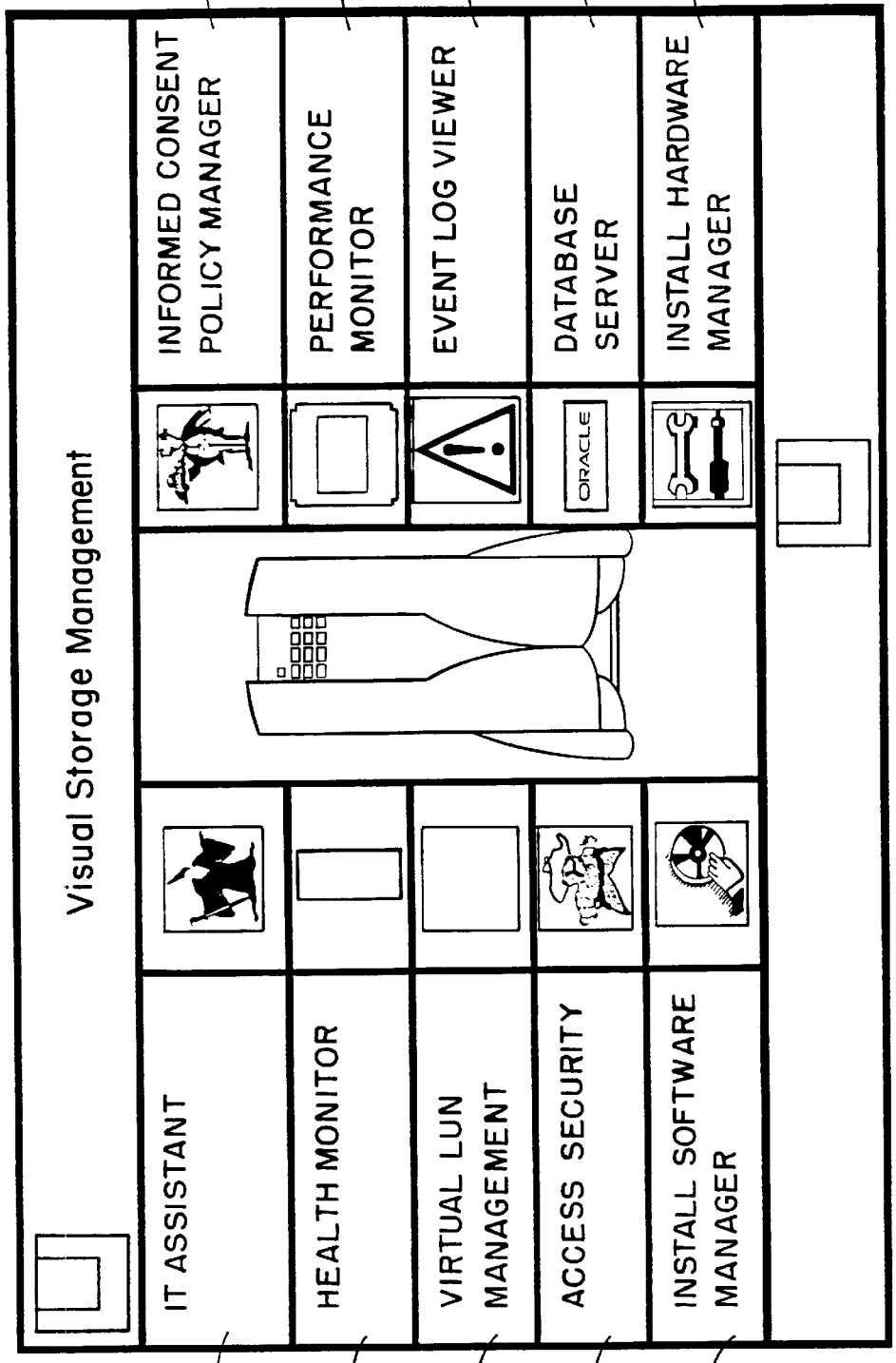
FIG. 10 is an illustration of a management interface to an intelligent storage area network server.

FIG. 10 is an illustration of a management interface to an ISAN server. This could be the interface provided by the front panel display 950 or over a TCP/IP connection using a web browser.

FIG. 10 includes a display window 1100 which provides controls for monitoring and managing the system. In one alternative, a touch sensitive display is be used to control the system and provide input, allowing local input of configuration data and interaction which manages control directly at the ISAN server.

The IT assistant control 1102 provides an additional set of controls and screens for managing the creation of virtual stores.

The health monitor control 1104 provides access to information collected by the system about the status of system components. These screens include information about malfunctioning hardware, environmental controls, power status, memory problems, and the like.

The virtual LUN management control 1106 provides access to controls for mapping SCSI-3 LUNs to virtual devices on the ISAN server. For example, the virtual LUN management control 1106 might present the information from Tables 1 and 2 in a graphical format for adjustment. Alternatively, it might provide two views, one which allows direct editing of the information in the export table and the virtual device table and one that allows data storage to be mapped without reference to the details of the circuit. In this embodiment, the administrator simple selects the type of storage she/he wants to create and then assigns it in a modified export table such as Table 3.

TABLE 3

| Storage Name | Export Information | Used/Capacity |
| --- | --- | --- |
| Mirrored Store Shared | SCS1 ID 5, LUN 0 TCP, Port 2000 | 17%/2048 Gb |
| Mirrored Store Engineering | SCS1 ID 5, LUN 1 | 14%/1024 Gb |
| Mirrored Store Web Site | SCS1 ID 5, LUN 2 | 36%/1024 Gb |
| Mirrored Store Advertising | SCS1 ID 5, LUN 1 | 39%/2048 Gb |
| External Disk Array Billing DB | SCS1 ID 5, LUN 3 | 97%/1024 Gb |
| External Disk Array Client DB | SCS1 ID 5, LUN 4 | 12%/1024 Gb |

In this fashion, the administrator does not need to concern herself/himself with the setup of the virtual circuits. A rules based management system provides intelligent setup and configuration of the virtual circuits. In this embodiment, a variety of preset storage types such as mirrored, striped, and external data stores are provided. The administrator provides a name to refer to them by and the amount of storage needed. Using rules based templates, a virtual circuit conforming to the desired storage type can be configured in the export table and the virtual device table using one or more of the available storage options.

The access security control 1108 provides access to controls for security over the ISAN server and access to configuration information.

The install software control 1110 provides access to controls for installing software such as new device driver modules, code updates, bug fixes, application code, management code, and other programs on the ISAN server.

The informed consent policy manager control 1112 provides an interface to controls and screens for providing intelligent solutions to common storage problems. The informed consent policy manager helps copy information off of a storage device that might be failing and place it on functioning storage devices. The informed consent policy manager will help change a virtual device away from using a storage device that is reaching its capacity to other storage devices that have less utilization and more capacity. The informed consent policy manager provides intelligent consent driven system management to respond to and correct most storage server problems.

The performance monitor control 1114 provides access to controls and screens describing the performance of the ISAN server including throughput, usage statistics, storage space available, and other performance information.

The event log control 1116 provides access to the system log. Controls are provided for filtering the severity of log messages to view.

The Oracle Database Server control 1118 provides access to an Oracle database operating on this ISAN server. The management interface is customizable based on the applications installed and the administrator's preferences. Here, an ASP card has been installed to provide application specific support for Oracle databases. This control provides access to management features of the Oracle database ASP.

The install hardware control 1120 provides access to controls and screens for adding and removing hardware. The ISAN server is designed to support hot swappable disk drives and hot swappable insertion and removal of hardware cards. This feature allows the administrator to indicate that hardware cards need to be removed or added. These controls allow the user to request that a new hardware module be recognized and initialized by the system.

FIG. 11 illustrates a storage area network utilizing a storage server 1200 according to the present invention. The storage server 1200 in the network has client interfaces 1210, 1211, 1212 coupled to client servers 1201, 1202, and 1203 respectively. Storage interfaces 1213 and 1214 are coupled to communication channels to storage devices 1205, 1206, 1207. The communication channel 1213 in this example is connected through a hub 1204 to the devices 1205 and 1206. In operation, the client interfaces operate according to protocol by which the client servers requests storage transactions by commands which carry an identifier of an initiator, a logical extent such as a LUN number, and an identifier of a target device. The storage server 1200 maps in the requested transaction to a virtual device, which in turn allocates physical storage for use in the transaction from among the physical storage devices. Also the storage server 1200 includes resources that emulate the target physical device identified in the request. The storage server 1200 is able to direct storage transactions using local configuration data, and simplify the management of storage for the client servers.

FIG. 12 illustrates another embodiment of a storage area network. In FIG. 12, a server 1250 which includes storage director logic and cache memory as discussed above, is coupled to client servers on a variety of different platforms, including a Hewlett-Packard server 1255, a Sun server 1256, and a SGI server 1257, each of which may be executing different protocols management of storage transactions. A plurality of physical storage devices is also coupled to the. server 1250 and managed by the storage director according to the virtual device architecture described above. The plurality of physical storage devices in this example include storage on a Hewlett-Packard platform 1251, storage on a Sun platform 1252 and a storage upon a EMC platform 1253. Thus, the server including storage director logic allows creation of a shared storage pool that can support legacy servers and storage in a heterogeneous environment. Incompatibilities among the plural storage devices and servers can be masked or mimicked as needed using the virtual device architecture. True storage area network environments can be implemented and all host, fabric and storage interoperability issues can be managed at the storage server level.

The storage director logic utilizing the virtual device architecture provides a single intelligent coordination point for the configuration of server access to storage. No hardware re-configuration is necessary in adding new devices or changing management of existing devices. The configuration of the storage server provides accurate configuration information and control by allowing automatic maintenance of the mapping of data sets in physical storage to servers. Maintaining accurate map of physical storage simplifies management of storage area network significantly. Also, the storage director at the server provides for active migration of data from old storage devices to new storage devices while the devices remain online. In addition storage objects are no longer limited in size by the size of the largest object that can be created in an array. Multiple arrays can be concatenated into a single storage object independent of host operating systems running on client servers. The storage director can also manage backup and testing operations such as making snapshots of data in the nonvolatile cache, and for managing data backup by copying data from disk to tape for example without being routed through the client server. Furthermore, the local cache can be used to migrate data from arrays that have lost redundancy and to repair redundant storage and maintain full availability of data while an array is being repaired or rebuilt. For applications having multiple servers accessing a common data set, locking logic can be placed in the storage server in a manner which provides a simple scalable solution using the virtual device architecture.

The storage director logic in the storage server operates to consolidate caching requirements from both servers and storage to reduce the total amount of cache memory required for a storage area network. The system is able to allocate more cache to either the server the client server or storage system than either can effectively provide as internal memory. Further the cache can be dynamically or statically allocated as defined by the applications using system.

FIG. 13 illustrates a more rigorous example of a storage area network using a plurality of interconnected storage servers according to the present invention. Storage servers 1300, 1301, and 1302 are included, interconnected by communication channels 350, 351 using for example a high speed protocol such as fiber channel, Gigabit ethernet, or ATM. Each includes storage director logic and nonvolatile cache in the preferred embodiment. The storage servers 1300, 1301, and 1302 are coupled to a plurality of client servers 1310 through 1318 in this example. The client servers 1313 and 1314 are connected through a hub 1320 to the storage server 1301. Likewise, the client servers 1316 through 1318 are connected to a hub 1321 which in turn connected to the storage server 1302. The client servers 1310–1318 communicate with the storage server using storage channel protocols such as FCP described in detail above. According these protocols storage transactions are requested, and carry an identifier of the initiator of the request, a logical unit number LUN, and an identifier of the target storage device. These parameters are used by the storage director logic to map the storage transaction to a virtual device. The servers also include resources to emulate the target storage device so that the client servers smoothly interoperate with the plurality of storage devices in the storage area network.

In FIG. 13, there are plurality storage devices 1330 through 1339 illustrated coupled to the storage servers 1300–1302. In the diagram, a variety of symbols are used to represent the storage devices, to indicate that the network is heterogeneous and can utilize a wide variety devices managed by the virtual device interfaces at the servers 1301 through 1302. Also, the communication channels can be varied. Thus, hubs 1340, 1341 and 1342 are included in the network to facilitate a variety communication protocols between the storage devices and the storage servers.

Conclusion

Accordingly an intelligent storage area network (ISAN) server architecture has been described. The ISAN server architecture supports easy administration, uses standard components, provides an operating system, supports virtual devices, and high speed solid state drive systems.

The foregoing description of various embodiments of the invention have been presented for purposes of illustration and description. It is not intended to limit the invention to the precise forms disclosed. Many modifications and equivalent arrangements will be apparent.

What is claimed is:

1. A storage server comprising:
   a processing unit,
   a bus system coupled with the processing unit, including a plurality of slots, slots in the plurality of slots including interfaces to respective data stores;
   a communication interface; and
   an operating system coupled with the processing unit, the operating system including:
   logic controlling transfers among the plurality of slots over the bus system according to an internal format,
   logic for translating a storage transaction received over the communication interface into the internal format;
   logic for configuring the plurality of slots according to configuration data;
   logic to monitor the performance and condition of the storage server;
   wherein the configuration data includes a table mapping virtual circuits to respective interfaces to data stores; and
   wherein the logic to monitor the performance and condition of the storage server includes logic to rank a data source according to the performance of the data source and to mirror data from data sources performing below a threshold to a data source performing above the threshold.

2. The storage server of claim 1, wherein the communication interface comprises an interface to fibre optic medium.

3. The storage server of claim 2, wherein the communication interface includes a driver compliant with a fibre channel arbitrated loop.

4. The storage server of claim 1, wherein the communication interface further includes a driver compliant with a standard "small computer system interface version 3" (SCSI-3 ) driver.

5. The storage server of claim 1, wherein the communication interface includes a driver compliant with an Ethernet interface.

6. The storage server of claim 5, wherein the communication interface supports a driver compliant with an Internet protocol (IP).

7. The storage server of claim 1, wherein the processing unit is comprised of a plurality of processing units.

8. The storage server of claim 1, wherein the bus system comprises a plurality of interconnected computer buses.

9. The storage server of claim 8, wherein the plurality of interconnected computer buses are compliant with standard "peripheral component interconnect" (PCI) buses.

10. The storage server of claim 1, wherein the communication interface comprises a network interface card coupled to one of the plurality of slots.

11. The storage server of claim 1, wherein the communication interface is coupled to the bus system.

12. The storage server of claim 1, wherein at least one of the interfaces to data stores includes a nonvolatile storage interface.

13. The storage server of claim 12, wherein the nonvolatile storage interface comprises a flash memory interface.

14. The storage server of claim 1, wherein at least one of the interfaces to data stores includes an interface to a host bridge controller.

15. The storage server of claim 14, wherein the interface to the host bridge controller comprises an interface to a second system bus.

16. The storage server of claim 14, wherein the interface to the host bridge controller includes a bridge to a second communication interface, the second communication interface comprises an interface to a fibre optic medium.

17. The storage sever of claim 14, wherein the interface to the host bridge controller includes a bridge for connection to a second storage server.

18. The storage server of claim 1, wherein at least one of the interfaces to data stores includes an interface to a random access memory (RAM).

19. The storage server of claim 1, wherein at least one of the interfaces to data stores includes a cache memory interface, and further includes cache memory coupled to the cache memory interface.

20. The storage server of claim 1, wherein at least one of the interfaces to data stores includes a controller for at least one disk drive.

21. The storage server of claim 20, wherein the controller supports an array of disk drives.

22. The storage server of claim 20, wherein the controller supports a redundant array of disk drives.

23. The storage server of claim 20, wherein the controller includes drivers compliant with standard "redundant arrays of independent disks" (RAID) protocol.

24. The storage server of claim 20, wherein the at least one disk drive is coupled to the controller by a fibre optic medium.

25. The storage server of claim 1, wherein the logic for translating a storage transaction received over the communication interface into an internal format includes logic for translating a SCSI-3 instruction and data into an internal format.

26. The storage server of claim 1, wherein the configuration data includes data mapping SCSI-3 logical unit numbers (LUNs) to respective virtual circuits.

27. The storage server of claim 1, wherein the configuration data includes a table mapping virtual circuits to respective interfaces to data stores.

28. The storage server of claim 1, wherein the logic to monitor performance and condition of the storage server includes logic to handle a data source failure.

29. The storage server of claim 1, wherein the logic to monitor the performance and condition of the storage server includes logic to handle a communication interface failure.

30. The storage server of claim 1, wherein the logic to monitor the performance and condition of the storage server includes logic to handle a processing unit failure.

31. The storage server of claim 1, wherein the logic to monitor the performance and condition of the storage server includes logic to handle a bus system failure.

32. The storage server of claim 1, wherein the logic to monitor the performance and condition of the storage server includes logic to map storage transactions to data sources based on the condition of the data source.

33. The storage server of claim 1, wherein the logic to monitor the performance and condition of the storage server includes logic to report errors.

34. The storage server of claim 1, including a user interface supporting input of configuration data.

35. The storage server of claim 34, wherein the user interface comprises a graphical user interface.

36. The storage server of claim 34, wherein the user interface comprises a touch screen coupled to the storage server.

37. A storage server comprising:
a communication interface, the communication interface supporting a storage transaction communication channel;
a logic for translating a storage transaction received over the storage transaction channel to an internal format;
a logic for routing the storage transaction in the internal format to a virtual circuit, the virtual circuit managing connections to respective data stores in communication with the storage server;
wherein resources controlled by the processor include processes to mirror storage transactions across plural virtual or physical storage devices; and
wherein the managing connections to respective data stores include changing mapping of extents of storage for the virtual circuit.

38. The storage server of claim 37, wherein virtual circuit comprises logic for translating the internal format to one or more communication protocols for a corresponding one or more data stores.

39. The storage server of claim 38, wherein the respective communication protocols for corresponding respective data sources include a protocol compliant with a standard "intelligent input/output" ($I_2O$) message format.

40. The storage server of claim 38, wherein the respective communication protocols for corresponding respective data sources include a protocol compliant with a standard $I_2O$ block storage architecture (BSA) format.

41. The storage server of claim 38, wherein the respective communication protocols for corresponding respective data sources include a protocol compliant with a standard $I_2O$ SCSI format.

42. The storage server of claim 38, wherein the respective communication protocols for corresponding respective data sources include a protocol compliant with a standard $I_2O$ format.

43. The storage server of claim 37, wherein the communication interface comprises an interface to a fibre channel arbitrated loop.

44. The storage server of claim 37, wherein the storage transaction communication channel comprises a channel compliant with a standard "small computer system interface version 3" (SCSI-3) communication channel.

45. The storage server of claim 37, wherein the internal format comprises a protocol compliant with a standard $I_2O$ message format.

46. The storage server of claim 37, wherein the logic for routing storage transactions to a virtual circuit includes a table, the table having a plurality of entries, the plurality of entries indicating a correspondence between an address extent specified in the storage communication channel and a virtual circuit.

47. The storage server of claim 37, wherein the logic for routing storage transactions to a virtual device includes a table, the table having a plurality of entries, the plurality of entries indicating a correspondence between a virtual circuit and respective data sources.

48. The storage server of claim 37, including a cache, and wherein a virtual circuit communicates with the cache.

49. The storage server of claim 37, including a hard disk, and wherein a virtual circuit communicates with the hard disk.

50. The storage server of claim 37, wherein respective data stores include a nonvolatile memory.

51. The storage server of claim 37, wherein respective data stores include an array of hard disks.

52. The storage server of claim 37, including a user interface supporting input of configuration data.

53. The storage server of claim 52, wherein the user interface comprises a graphical user interface.

54. The storage server of claim 52, wherein the user interface comprises a touch screen coupled to the storage server.

55. A storage router comprising:
a first communication interface;
a plurality of other communication interfaces;
a processing unit;
a bus system coupled with the processing unit, the first communication interface, and the plurality of other communication interfaces;
an operating system coupled with the processing unit, the operating system including logic for routing a storage transaction received over the first communication interface to respective other communication interfaces according to configuration data;

wherein the configuration data includes a table mapping virtual circuits to respective interfaces to data stores; and wherein the operating system includes logic to rank a data source according to the performance of the data source and to mirror data from data sources performing below a threshold to a data source performing above the threshold.

56. The storage router of claim 55, wherein the first communication interface comprises an interface to a fibre channel medium.

57. The storage router of claim 55, wherein the first communication interface further includes the standard SCSI-3 driver.

58. The storage router of claim 55, wherein the plurality of other communication interfaces includes an interface to a fibre channel medium.

59. The storage router of claim 55, wherein the plurality of other communication interfaces include an interface to a fibre channel medium.

60. The storage router of claim 55, wherein the plurality of other communication interfaces further include the standard SCSI-3 driver.

61. The storage router of claim 55, wherein the configuration data includes a table, the table having a plurality of entries, the plurality of entries indicating a correspondence between an address extent specified in the storage transaction and a virtual circuit.

62. The storage router of claim 55, wherein the configuration data includes a table, the table having a plurality of entries, the plurality of entries indicating a correspondence between a virtual circuit and one or more drivers for controlling one or more data stores coupled to the plurality of other communication interfaces.

63. The storage router of claim 55, including a user interface supporting input of configuration data.

64. The storage server of claim 63, wherein the user interface comprises a graphical user interface.

65. The storage server of claim 63, wherein the user interface comprises a touch screen coupled to the storage server.

66. A server for a storage network including at least one client system which produces requests for storage transactions, a client communication channel to and from the client system, a plurality of storage devices, and respective communication channels to and from the storage devices in the plurality, comprising:

a processor, including a bus system;

a client interface to the client communication channel coupled to the bus system;

a plurality of interfaces to the respective communication channels coupled to the bus system;

a non-volatile cache memory coupled to the bus system;

resources controlled by the processor to receive requests for storage transactions on the server interface, to direct the requested storage transactions to the plurality of storage devices and to allocate the non-volatile cache memory for uses in the storage transactions;

wherein resources controlled by the processor include processes to mirror storage transactions across plural virtual or physical storage devices; and wherein the resources controlled by the processor include processes to change the mapping of extents of storage for the virtual device.

67. The server of claim 66, wherein the resources controlled by the processor include processes to authenticate and verify access permissions for storage transactions.

68. The server of claim 66, wherein the resources controlled by the processor include processes to map the requested storage transactions to virtual storage devices, and from virtual storage devices to physical storage devices.

69. The server of claim 66, wherein the resources controlled by the processor include logic to configure virtual storage devices having logical addresses mapping to extents of storage in one or more physical storage devices in the plurality of storage devices.

70. The server of claim 66, including a user interface by which configuration data is supplied to the processor for use by said logic.

71. The server of claim 66, wherein the resources controlled by the processor include processes coupled with the client interface which emulate a physical storage device in response to requests for storage transactions according to a protocol identifying a target physical storage device.

72. The server of claim 66, wherein the resources controlled by the processor include logic to configure a virtual storage device mapping to extent of storage in one or more physical storage devices in the plurality of storage devices to support the requests for storage transactions according to the protocol identifying the target physical storage device.

73. The server of claim 66, wherein the resources controlled by the processor include logic to configure a virtual storage device mapping to extents of storage in one or more physical storage devices in the plurality of storage devices to support the requests for storage transactions according to the protocol identifying the initiating device and the storage.

74. The server of claim 66, wherein the protocol comprise a protocol compliant with a SCSI standard.

75. The server of claim 66, wherein the protocol comprise a protocol compliant with a FCP standard.

76. The server of claim 72, wherein the protocol comprise a protocol compliant with a SCSI standard.

77. The server of claim 72, wherein the protocol comprise a protocol compliant with a FCP standard.

* * * * *